US012737915B2

(12) United States Patent
Seng et al.

(10) Patent No.: US 12,737,915 B2
(45) Date of Patent: Sep. 15, 2026

(54) METHOD AND SYSTEM FOR OBJECT DETECTION

(71) Applicant: TOP seven GmbH & Co. KG, Starnberg (DE)

(72) Inventors: Ulrich Seng, Starnberg (DE); Oliver Neubauer, Starnberg (DE); Herbert Stocker, Starnberg (DE)

(73) Assignee: TOP SEVEN GMBH & CO. KG, Starnberg (DE)

( * ) Notice: Subject to any disclaimer, the term of this patent is extended or adjusted under 35 U.S.C. 154(b) by 549 days.

(21) Appl. No.: 18/170,629

(22) Filed: Feb. 17, 2023

(65) Prior Publication Data

US 2023/0196612 A1 Jun. 22, 2023

Related U.S. Application Data

(63) Continuation of application No. PCT/EP2021/073052, filed on Aug. 19, 2021.

(30) Foreign Application Priority Data

Aug. 20, 2020 (DE) ..................... 10 2020 210 618.5

(51) Int. Cl.
*G06T 7/73* (2017.01)
*G06T 7/00* (2017.01)
(Continued)

(52) U.S. Cl.
CPC .............. *G06T 7/73* (2017.01); *G06T 7/0002* (2013.01); *G06T 7/66* (2017.01); *G06V 10/44* (2022.01);
(Continued)

(58) Field of Classification Search
CPC ......... G06T 7/73; G06T 7/0002; G06V 10/44; G06V 20/17; G06V 10/751; G01M 5/0016; G01M 5/0058; G01M 5/0091
See application file for complete search history.

(56) References Cited

U.S. PATENT DOCUMENTS 11,435,650 B2 9/2022 Schickel et al.
2014/0168420 A1* 6/2014 Naderhirn ........... G01M 5/0091 348/128
(Continued)

FOREIGN PATENT DOCUMENTS

CN 106762451 A * 5/2017 ............. F03D 17/00
CN 108369743 A 8/2018
(Continued)

OTHER PUBLICATIONS

Maes, K., De Roeck, G., & Lombaert, G. (2018). Motion tracking of a wind turbine blade during lifting using RTK-GPS/INS. Engineering Structures, 172, 285-292. (Year: 2018).*
(Continued)

*Primary Examiner* — Stephen R Koziol
*Assistant Examiner* — Ashley Hytrek
(74) *Attorney, Agent, or Firm* — McClure, Qualey & Rodack, LLP

(57) ABSTRACT

A method for detecting an object describable by a plurality of predetermined features comprises flying along the object and detecting several portions of the object using at least one recording unit. Each of the portions is detected multiple times from different positions of the recording unit to generate a set of images. Position and location information of the recording unit are associated to each image. Additionally, the method has recognizing features in the image sets and determining the positions and/or locations of the
(Continued)

features using the position and location information of the images which contain the features.

14 Claims, 10 Drawing Sheets

(51) Int. Cl.
*G06T 7/66* (2017.01)
*G06V 10/44* (2022.01)
*G06V 20/10* (2022.01)
*G06V 20/17* (2022.01)

(52) U.S. Cl.
CPC ............ *G06V 20/17* (2022.01); *G06V 20/176* (2022.01); *G06T 2207/10032* (2013.01); *G06T 2207/30181* (2013.01)

(56) References Cited

U.S. PATENT DOCUMENTS

2019/0066283 A1 2/2019 Gros
2019/0370999 A1 12/2019 Liu et al.
2020/0082168 A1* 3/2020 Fathi ...................... G06T 7/521

FOREIGN PATENT DOCUMENTS

CN 108496129 A 9/2018
CN 109931889 A * 6/2019
JP 2017-090145 A 5/2017
JP 2018-181235 A 11/2018
JP 2019023865 A 2/2019
JP 2019-078589 A 5/2019
WO 2017/045251 A1 3/2017
WO 2018/166645 A1 9/2018

OTHER PUBLICATIONS

Shihavuddin, A. S. M., Chen, X., Fedorov, V., Nymark Christensen, A., Andre Brogaard Riis, N., Branner, K., . . . & Reinhold Paulsen, R. (2019). Wind turbine surface damage detection by deep learning aided drone inspection analysis. Energies, 12(4), 676. (Year: 2019).*
Moolan-Feroze, O., Karachalios, K., Nikolaidis, D. N., & Calway, A. (Nov. 2019). Simultaneous drone localisation and wind turbine model fitting during autonomous surface inspection. In 2019 IEEE/RSJ International Conference on Intelligent Robots and Systems (IROS) (pp. 2014-2021). IEEE. (Year: 2019).*
Japanese language office action dated Dec. 27, 2023, issued in application No. JP 2023-512685.
English language translation of office action dated Dec. 27, 2023 (pp. 7-16).
International Search Report and Written Opinion issued in application No. PCT/EP2021/073052.
Shihavuddin, A.S.M., et al.; "Wind Turbine Surface Damage Detection by Deep Learning Aided Drone Inspection Analysis;" Energies; Feb. 2019; pp. 1-15.
Chinese language office action dated Nov. 26, 2025, issued in application No. CN 2021800716518 (English language translation, pp. 1-10 of attachment).
Qiu, Z., et al.; "Wind turbine blade defect recognition based on unmanned aerial vehicle image;" Power Generation Technology; vol. 39; No. 3; Jun. 2018; pp. 277-285 (English language abstract, p. 1 of publication).

* cited by examiner

METHOD AND SYSTEM FOR OBJECT DETECTION

CROSS-REFERENCE TO RELATED APPLICATIONS

This application is a continuation of copending International Application No. PCT/EP2021/073052, filed Aug. 19, 2021, which is incorporated herein by reference in its entirety, and additionally claims priority from German Patent Application No. 10 2020 210 618.5, filed Aug. 20, 2020, which is also incorporated herein by reference in its entirety.

TECHNICAL FIELD

The present disclosure relates to methods and systems for object detection. Embodiments relate to methods and systems for generating calibration data for automatic position determination or waypoint generation for autonomous flights of an unmanned aerial vehicle (UAV), in preparation for a method for determining a path along an object, for example, a wind turbine.

BACKGROUND OF THE INVENTION

Apart from solar and hydroelectric power plants, wind turbines are one among the most important sources of renewable energy. Regular maintenance and inspection are indispensable for the safe and low-failure operation of the plants.

Conventional approaches involve climbing teams which examine the plants. Apart from the inherent risk to climbers, such an approach is impractical for the large number of plants. The availability of climbing teams and their work speed is insufficient for a sufficiently close monitoring.

Newer approaches use drones to examine wind turbines. However, even these approaches usually entail an experienced human pilot to take images of the turbine, using the drone, which are analyzed later on. This in turn entails specially trained personnel, which limits the availability and causes costs.

In addition, methods for automatically recording visual control data by means of drones are known. WO 2018/166645 A1, for example, describes a method in which a drone automatically and/or autonomously flies along a wind turbine using pre-calculated waypoints and generates data for evaluation.

One problem with such measures is generating calibration data used to determine flight paths for a drone. Frequently, manufacturer data and position data of plants are not sufficient or too imprecise. In many cases, there is no reliable model, for example CAD model of the plant or a detailed specification available, using which a flight route or waypoints for a drone can be calculated.

The object underlying the present disclosure is providing a method and a system allowing object detection in reduced time and good quality, which can be used, for example, for a fast and safe inspection of wind turbines.

SUMMARY

According to an embodiment, a method for detecting an object describable by a plurality of predetermined features may have the steps of:

(a) flying along the object and detecting several portions of the object using at least one recording unit, wherein each of the portions is detected multiple times from different positions of the recording unit to generate a set of images, wherein position and location information of the recording unit are associated to each image; and (b) recognizing features in the image sets; and (c) determining the positions and/or locations of the features using the positon and location information of the images which contain the features.

According to another embodiment, a method for inspecting an object may have the steps of: flying along the object along a path, and detecting one or more portions of the object while flying, wherein the path is based on a representation of the object by the features or parameters obtained by the inventive method for detecting an object describable by a plurality of predetermined features.

According to another embodiment, a system for detecting an object describable by a plurality of predetermined features may have: a measuring device which forms a recording unit alone or in combination with a drone, the measuring device being configured: to fly along the object, to detect several portions of the object from different positions to generate a set of images, wherein position and location information of the measuring device are associated to each image; and an evaluation device configured to recognize features in the image sets and determine positions and/or locations of the features using the position and location information of the images which contain the features.

Embodiments of the present disclosure provide a method for detecting an object describable by a plurality of predetermined features. The method comprises flying along the object and detecting several portions of the object using at least one recording unit. Thus, each of the portions is detected multiple times from different positions of the recording unit to generate a set of images. Thus, position and location information of the recording unit are associated to each image when generating the image. Additionally, the method comprises detecting features in the image sets and determining the positions, for example coordinates and/or locations of the features, using the position and location information of the images which contain the features.

In accordance with embodiments, an object can be a wind turbine, a crane, or a power pole. Such an object can be described using characteristic geometries or features. In the case of wind turbines, the features include the rotor blade tips and rotor blade flanges, for example. A power pole, for example, is described by its booms, the tower center and the tower top. When the positions and locations of the features are known, a model of the object can be set up. The recording unit may be a drone having a detection unit, or a corresponding module for a drone. The detection unit may, for example, be configured to enable detection by means of laser. Additionally, the detection unit may be a camera. The recording unit may additionally comprise a plurality of drones, like a swarm of drones. Detecting may comprise a plurality of optimization steps, for example for improving backlight effects when recording an image. The position and location information, like the site and orientation, for example, of the recording unit associated to each image may be in an absolute coordinate system, for example world coordinates, or a relative coordinate system with respect to a reference. Detecting features in the image sets can be performed automatically, for example by means of AI (artificial intelligence), or manually by a human being.

Further embodiments of the present disclosure provide a system for detecting an object describable by a plurality of predetermined features. The system comprises a measuring device which forms a recording unit alone or in combination with a drone. The measuring device is, for example, configured to fly along the object and detect several portions of the object from different positions to generate a set of images, wherein position and location information of the measuring device are associated to each image. Additionally, the system comprises an evaluation device configured to detect features in the image sets and to determine positions, like coordinates, and/or locations of the features using the position and location information of the images which contain the features.

In accordance with embodiments, the measuring device is a module for a drone. The module can comprise a device for detecting, or for a drone, which is equipped already with a detection unit, only a calculating or data processing unit. The module may comprise a control element for the drone and enable automatic drone flight. Additionally, the module can be configured for communicating with the evaluation device. The evaluation device can additionally comprise a calculator or corresponding software on a computer. A cloud-based evaluation device is also possible. Correspondingly, the evaluation device and the measuring device can also act locally separately from each other. In terms of time, the recording unit can first generate the image sets and then transmit them to the evaluation device. The evaluation can take place immediately, or with a time delay.

In accordance with the present disclosure, an object is detected by determining positions and/or locations of predetermined features using which the object can be described. Determining the positions and/or locations of the features here is done using position and location information of image sets containing the features. Here, the object to be detected is flown to and along by a recording unit. The recording unit detects several portions of the object multiple times from different positions. The result is several sets of images. Position and location information of the recording unit are associated to each image when generating the image. Subsequently, the predetermined features in the image sets are recognized. Due to the known position and location information of the images, conclusions can be drawn as to the positions and/or locations of the predetermined features. By recording portions of the object multiple times, depth information, like the distance of the identified feature from the recording unit, can be generated. Additionally, a statistical evaluation is enabled by evaluating image sets, which on the one hand improves the precision of the position and location information and, on the other hand, can also enable statements on the quality of the position and location information, like in the form of variances. Consequently, in the case of high quality of the position and location information, smaller distances between a drone and an object to be inspected can be set without the risk of collision.

In accordance with embodiments of the present disclosure, detecting several portions of the object is an optical detection. In the case of optical detection, the detection unit may be configured to be a camera. Many drones are equipped already with cameras so that this is a particularly inexpensive way of providing a recording unit for the method according to the disclosure, for example. In addition, a plurality of optimization methods are known for optical detection processes, thereby increasing the quality of a detected image, for example, for improving subsequent evaluation.

In accordance with embodiments of the present invention, determining the positions and/or locations of the features further comprises setting up a plurality of geometrical auxiliary constructions, like rays or straights (straight lines) or direction vectors, wherein the geometrical auxiliary constructions for each image which contains a feature, are set up between:

the position of the recording unit associated to each image and the position of a feature identified in the image, or the positions of several features identified in an image, in a coordinate system.

Furthermore, the geometrical auxiliary constructions are evaluated in pairs, for example, to obtain an amount of results for the position and/or location, like the site and/or orientation of the feature or a feature derived from several features. The amount of results can further be evaluated statistically.

The geometrical auxiliary constructions can include straights from the points of intersection of which the position of the feature can be determined. Thus, geometrical auxiliary constructions may explicitly not be taken into consideration, for example, when recognizing that these were identified incorrectly.

Due to the auxiliary constructions, the entailed computational effort for evaluation can be limited since the relevant information regarding position and location of a feature can be described by the auxiliary construction and not the entire image information have to be processed. In accordance with embodiments, positions and/or locations of derived features can be determined. An object may comprise features the positions and/or locations of which are difficult to identify or recognize using an optical evaluation, for example. Such a feature may be related to better identifiable features of the object via known geometrical relations. Exemplarily, direct identification of the center of a rotor flange of a wind turbine may be difficult or impossible to determine using an image set since the center of the flange is located within a region obscured/by the mounted rotor blade. Drawing conclusions as to the position of the center using neighboring points, for example, symmetrically around the center, on a circumcircle around the center of the flange, in contrast, may be much easier.

In accordance with embodiments of the present disclosure, the method further comprises determining an orientation, like location information or orientation/, of the object by evaluating a reference position of the object and position information of the recording unit, wherein the recording unit is positioned in correspondence with the orientation of the object at the time of recording the position information.

The orientation to be determined may, for example, be the orientation of a wind turbine. The recording unit can be a drone.

This type of determining the orientation can be performed quickly and does not require additional measuring equipment, but only the recording unit. In particular, sufficiently accurate data, with which a subsequent autonomous drone flight can be performed can be detected quickly by, for example, an approximate determination of the orientation.

According to embodiments of the present disclosure, the method further comprises determining the reference position, like center of the object, by evaluating an amount of position information of the recording unit, wherein the amount of position information is derived from a trajectory of motion, for example, circling the object, of the recording unit.

The reference position may be the tower center of a wind turbine. This can be determined by the recording unit, like a drone. The trajectory of motion can originate from at least partly circling the wind turbine, for example along the outer wall of the tower of the wind turbine.

Even when there aren't any reference data of the object, this discloses a quick possibility of determining a reference position. The trajectory of motion may be a circular path or a part of a circular path around the object.

In accordance with embodiments of the present disclosure, the method further comprises determining at least one dimension of the object, by evaluating a reference point of the object, and the position of one or more of the features.

The dimension of the object can be the hub height of a wind turbine. The hub height can be determined or verified in correspondence with the method according to the disclosure, for example if there are already information about the hub height. This allows a fast and automated determination of geometries of the object.

In accordance with embodiments of the present disclosure, the method further comprises determining the reference point, like a height as a zero point, of the object by placing the recording unit at the reference point and subsequently evaluating the position information of the recording unit.

The reference point may be a point from the two- or three-dimensional space, but also a scalar quantity, like a height above sea level. This allows, for example, quickly determining the reference point based only on the position information of the recording unit, without additional measuring devices.

In accordance with embodiments of the present disclosure, the recording unit is a drone, or a measuring device in combination with a drone, configured to generate the sets of images and associate to each image the position and location information of the recording unit at the time of recording the respective image.

By using a drone, regions of an object difficult to access can be detected quickly and without endangering a human being.

In accordance with embodiments of the present disclosure, the positions of the recording unit and the features comprise coordinates of a predetermined coordinate system.

In accordance with embodiments of the present disclosure, the method further comprises employing real-time kinematics, RTK, for correcting the position and location information of the recording unit.

The precision of determining the positon can be improved by the real-time kinematics system. Exemplarily, an improvement in accuracy of 2 cm can be achieved with regard to height information and an improvement in accuracy of 1 cm to 2.5 cm with regard to the other dimensions. This also provides an inexpensive way of generating sufficiently precise position and location data, for example, using which the object can be detected, without having to integrate complicated, expensive and heavy technology for precise position determination in the recording unit. The calibration flight here may comprise flying along the object and detecting several portions of the object. Additionally, a local, stand-alone coordinate system, like Prezi wave, can be used so that a GPS device does not have to be used.

In accordance with embodiments of the present disclosure, the step of flying along the object comprises flying along the object in an automated and/or autonomous manner.

Automated flying can provide a quick and easy detection of the object. For example, a drone pilot trained for manual flights can be dispensed with. With the elimination of human control intervention, the probability of collisions or incidents can also be reduced.

In accordance with embodiments of the present disclosure, the step of recognizing features in the image sets is an automated recognition of the features in the image sets and/or the step of determining the positions and/or locations of the features is an automated determination of the positions and/or locations of the features.

The costs for inspecting an object can be reduced by a high degree of automation of the method, for example by the quick performance or reduced personnel cost. In addition, human errors in the evaluation can be avoided.

In accordance with embodiments of the present disclosure, the object is a wind turbine, for example a wind power station, wind energy plant or wind wheel, wherein the wind turbine comprises a tower, a nacelle, a hub, rotor blade flanges and rotor blades and a common rotation axis of the rotor blades. Thus, the method further comprises determining one or more parameters of the wind turbine based on the positions, like coordinates and/or locations of the features.

Due to the many areas of a wind turbine which are difficult to access, a method according to the disclosure, for example, for the further use of collected data, or parameters for a subsequent inspection flight, can offer great advantages, in particular with regard to the duration of such data collection or measuring, for example. In addition, the use of an automated method according to the disclosure can save training costs for personnel, such as climbers and, in particular, significantly reduce the probability of occupational accidents, since climbers no longer have to be used for inspection, for example.

In accordance with embodiments of the present disclosure, the at least one parameter determined comprises a deformation and/or bending of the rotor blades. This is determined, for example, by an approximation of the path of the rotor blades by a mathematical function, like linear, exponential or logarithmic.

By determining the deformation and/or bending of the rotor plates, critical deviations from standard geometries can be recognized before failure of the plant occurs. The approximation by a mathematical function, for example based on certain characteristic positions and/or locations of features, like the position of the rotor blade tips and the position and/or location of the rotor blade flanges, can form a fast and, for example, little computationally intensive way of generating a sufficiently precise model for the path of the rotor blades. Information on the deformation and/or bending of the rotor blades can additionally be used to obtain a model for a waypoint generation for a subsequent inspection flight, for example, so that a drone can fly very close to a wind turbine in an automated manner due to the model to take high-resolution images, without the risk of a collision.

In accordance with embodiments of the present disclosure, the at least one parameter determined comprises a position, like the location of a rotor blade tip. Determining the position of the rotor blade tip comprises determining a straight between the position of the rotor blade tip identified in an image and the respective position of the recording unit. Additionally, for determining the straight, apart from the position of the recording unit at the time of recording the image and the identified position of the rotor blade tip, the location, like orientation or alignment of the recording unit at the time of recording the image, and characteristics of the recording unit, like aperture angle and number of pixels of a camera of the recording unit, are also taken into consideration. Additionally, a plurality of straights is determined and evaluated in pairs for a set of images of the rotor blade tip. A point of intersection is calculated for each pair of straights and the position of the rotor blade tip is calculated from the amount of pairs of straights.

Calculating the rotor blade tip can comprise a statistical evaluation of the calculated points of intersection. The evaluation may also comprise calculating a quality of the result. Using the quality, a measure of the accuracy of a set model of the wind turbine can be indicated, for example. In addition, pairs of straights unfavorable for calculating the position of the rotor blade tip can be discarded before evaluating the amount of points of intersection to obtain a more precise result. Detecting such unfavorable pairs of straights could be performed in that a calculated point of intersection of a pair of straights is outside a determined image region where the feature rotor blade tip, for example, has been identified.

A result for the position of a rotor blade tip can be calculated using this procedure according to the disclosure using easy mathematical methods, like with little calculating complexity. This allows an on-site evaluation, for example, with the computing power of a mobile computing unit.

In accordance with embodiments of the present disclosure, the at least one parameter determined comprises a position, like the center of a rotor blade flange. Determining the position of the rotor blade flange comprises determining a first straight between the position of a first point of the rotor blade flange identified in an image and the position of the recording unit and a second straight between the position of a second point of the rotor blade flange, opposite the first point, identified in the same image and the position, for example the coordinates, of the recording unit.

For determining the first and second straights, apart from the position, like the site of the recording unit at the time of recording the image and the identified positions of the points of the rotor blade flanges, the location, like orientation or alignment of the recording unit of the time of recording the image, and characteristics of the recording unit, like aperture angle and/or number of pixels of a camera of the recording unit, are also taken into consideration. Furthermore, another straight is determined, which runs in the center between the first and second straights. Additionally, a plurality of further straights is determined for a set of images of the rotor blade flange. The position of the rotor blade flange is determined from the plurality of further straights.

Determining the position of the rotor blade flange may include statistically evaluating the plurality of further straights. A result quality can be calculated from the statistical evaluation.

By the method according to the disclosure, the position of the rotor blade flange can be determined from an evaluation. A direct evaluation of the position of the rotor blade flange can be imprecise or impossible due to the mounted rotor blade. This problem can be solved, for example, by the fast and little computationally complex evaluation of two points, which are easy to identify by a machine, of the rotor blade flange per image in accordance with the method described.

In examples according to the present disclosure, the at least one parameter determined comprises a location of a rotor blade flange. Determining the location of the rotor blade flange comprises identifying two opposite points of the rotor blade flange in an image. Thus, a direction vector of a connecting straight between the positions of the two opposite points of the rotor blade flange is determined. Additionally, a plurality of direction vectors of connecting straights is determined for a set of images of the rotor blade flange. An amount of possible normal vectors of the rotor blade flange is calculated from the plurality of direction vectors of the connecting straights by forming the cross product of the direction vectors of the connecting straights in pairs. Additionally, a normal vector of the rotor blade flange is calculated from the amount of possible normal vectors.

Calculating the normal vector of the rotor blade flange can comprise statistically evaluating the amount of possible normal vectors and calculating a result quality for the normal vector. By determining the location of the rotor blade flanges and, thus, a rotation of the rotor, a method according to the disclosure is not dependent on a predefined positioning of the rotor blades of the wind turbine. No bolting, like to the 6 o'clock position of one of the rotor blades, is necessary, for example, to allow autonomous drone flights. This saves time and additional effort for aligning the wind turbine.

In accordance with embodiments of the present disclosure, the at least one parameter determined comprises the tower center, like the tower position. Determining the tower center comprises circling the tower along the outer wall of the tower by the recording unit, like at as equal a distance as possible from the wall of the tower, and recording the positions of the recording unit when circling the tower. Additionally, position subsets are formed from three points each, wherein the three points are at a predetermined distance from one another.

Additionally, an amount of centers of gravity of triangles can be determined from a plurality of position subsets, wherein each triangle is formed form the three points of a position subset. The tower center is calculated from the average of the centers of gravity. The tower center is calculated from the average of the centers of gravity. Alternatively or additionally, an amount of circle centers can be determined from a plurality of position subsets, wherein each circle center is determined from the three points of a position subset, using the general circle equation. Thus, the center of the tower is calculated from the amount of circle centers. Alternatively or additionally, a set of circumcircle centers can be determined from a plurality of the position subsets, wherein each circumcircle center is the center of a circumcircle of a triangle which is formed from the three points of a position subset. Thus, the center of the tower is calculated from the amount of circumcircle centers. The triangles can be, for example, equilateral or isosceles triangles.

Calculating the tower centers can comprise a statistical evaluation, and calculating a result quality. This provides a way of determining the position, like in the form of the center of the plant, based on position information of the recording unit, without any geographical a priori information, in one step. This means that the method is not dependent on precise known position information. By having a known tower center, a drone can fly autonomously to the wind turbine to detect it. When knowing the positions of several wind turbines of a wind park, several wind wheels can be detected autonomously one after the other by a drone.

In accordance with embodiments of the present disclosure, the method further comprises determining one or more of the following parameters:

the hub height, like the height of the rotation axis, the inclination of the rotation axis, the hub diameter, the orientation, like the heading, azimuth or azimuth angle of the wind turbine, the centers of the rotor blade flanges, the diameter of the rotor blade flanges, the length of the rotor blades, the inclination of the rotor blades, the positioning, like rotation of the rotor blades, for example with regard to rotation, the angle of inclination (pitch angle) of the rotor blades, the rotor blade thickness, and the rotor blade width.

Determining one or more of the parameters may thus comprise:

calculating a first normal vector of a first plane spanned by the positions of the rotor blade flanges, like flange centers, calculating a second normal vector of a second plane spanned by the positions of the rotor blade tips, determining a first center of a circle whose circular path is determined by the positions of the rotor blade flanges, like flange centers, and determining a second center of a circle whose circular path is determined by the positions of the rotor blade tips.

Determining the orientation of the plant, and the inclination of the rotation axis of the wind turbine can be done by evaluating one or both normal vectors.

Determining the hub height of the wind turbine can be performed by evaluating one or both centers and the reference point.

Determining the positioning of the rotor blades, for example relative to a common rotation axis, for example differing from the 6 o'clock position, for example, can be performed by comparing the positions of one or more rotor blade tips and/or one or more rotor blade flanges to the positions of the first and/or second calculated centers. Alternatively or additionally, determining the positioning of the rotor blades may be performed using the normal vectors of the rotor blade flanges.

Calculating the hub diameter, or estimating the hub diameter of the wind turbine, for example, can be performed using the distance of the positions of the rotor blade flanges.

By determining the parameters, a model of the wind turbine can be formed, which can be used to perform fully automated or autonomous inspection flights. Furthermore, deviations from nominal or standard geometries can be recognized by determining the parameters.

In accordance with embodiments of the present disclosure, the method additionally comprises generating or modifying a model or parameterizing a generic model, like a CAD (computer aided design) model, of the object using the position and/or location information of the features, for example for determining the waypoints for the autonomous flight. By setting up or adjusting a model of the wind turbine, a subsequent autonomous inspection flight may, for example, be performed based on the model. Additionally, a model also provides a quick and inexpensive way to incorporate a known change in the orientation of the wind turbine, for example without having to detect the object again.

Embodiments according to the present disclosure provide a method for inspecting an object, comprising flying along the object along a path and detecting one or more portions of the object during the flight. The path is based on a representation of the object by the features or parameters obtained by one or more of the methods described before.

This allows an automated inspection of the object. Due to the predetermined path, the drone pilot, for example, can focus entirely on monitoring the drone flight and does not have to take control of the drone.

In accordance with embodiments of the present disclosure, the evaluation device is part of the recording unit. The recording unit may, for example, be a drone which performs an evaluation itself, or in an evaluation unit which is part of it, like a calculating module. This means that an additional data transmission for evaluation, or an external evaluation device can be omitted, which makes the system easier.

In accordance with embodiments of the present disclosure, the evaluation device is configured to automatically recognize the features in the image sets and/or automatically determine the positions and/or locations of the features. Due to a high degree of automation, a method according to the disclosure can be performed quickly and inexpensively. This can also reduce the number of human errors.

According to embodiments of the present disclosure, the measuring device is configured to optically detect several portions of the object from different positions. Optical detection can be implemented in a cost-effective manner by a camera and allows using a plurality of well-known optimization methods for improving the recording quality, with regard to backlight, for example.

BRIEF DESCRIPTION OF THE DRAWINGS

Examples in accordance with the present disclosure will be discussed in greater detail below referring to the appended drawings. With regard to the illustrated schematic figures, it is pointed out that the functional blocks illustrated are to be interpreted to be both elements or features of a device in accordance with the disclosure or the system in accordance with the disclosure and corresponding method steps of the method in accordance with the disclosure and that corresponding method steps of the method according to the disclosure can be derived therefrom.

DETAILED DESCRIPTION OF THE INVENTION

Figure 1:
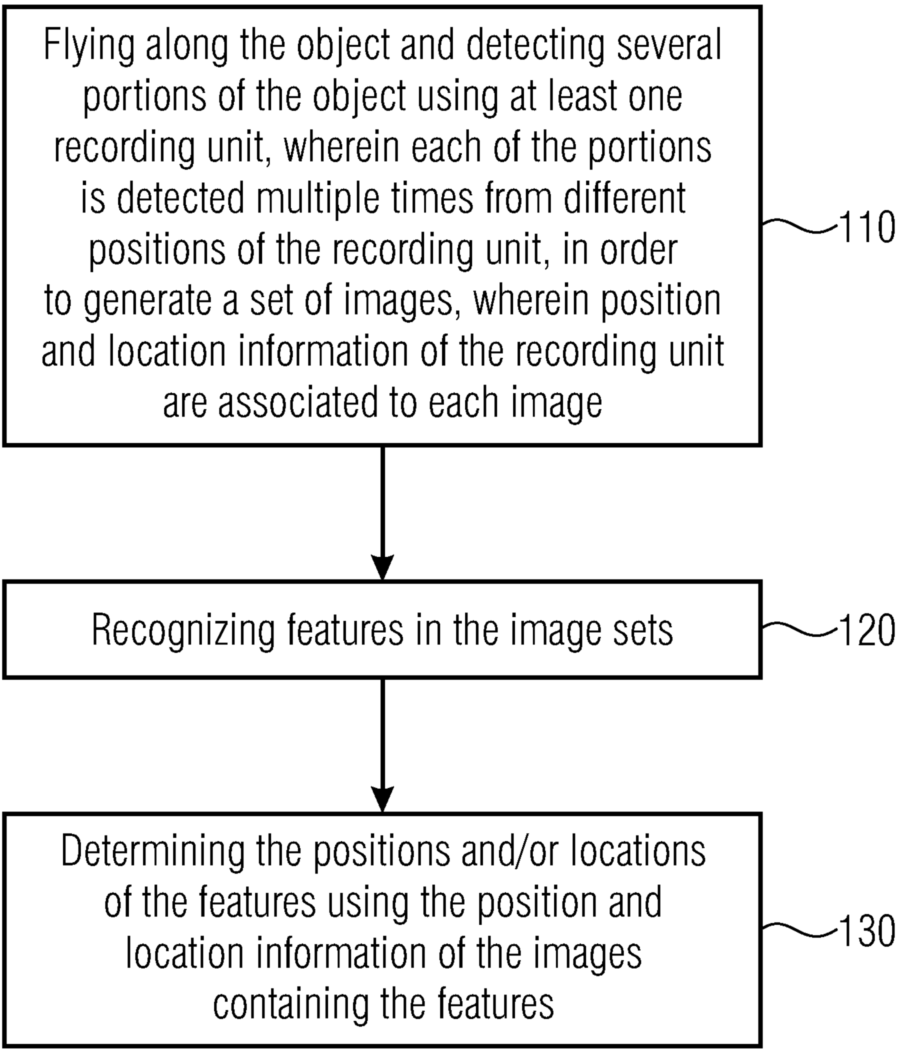
FIG. 1 is a flow chart of detecting an object in accordance with an embodiment of the present disclosure.

Before discussing below in greater detail examples of the present invention referring to the drawings, it is pointed out that identical elements, objects, and/or structures or those of equal function or equal effect are provided with same or similar reference numerals in the different figures so that the description of these elements illustrated in different examples is mutually exchangeable or mutually applicable.

FIG. 1 shows a flowchart of detecting an object in accordance with an embodiment of the present disclosure. FIG. 1 shows step 110, which comprises flying long the object and detecting several portions of the object using at least one recording unit, wherein each of the portions is detected multiple times from different positions of the recording unit in order to generate a set of images, wherein position and location information of the recording unit are associated to each image. Subsequently, in step 120, recognizing features in the image sets takes place and, in step 130, determining the positions and/or locations of the features using the position and location information of the images containing the features.

Flying along the object can thus be performed manually, for example, by a drone pilot, or in an automated manner, like autonomously. The portions of the object may be parts of the object, which comprise characteristic features. The position and location information can comprise coordinate and/or site information, or alignment and/or orientation information. Further information may also be associated to the image, like the aperture angle of the recording unit or the number of pixels, for example. Recognizing features can be done in an automated manner, or be performed manually. Artificial intelligence (AI), for example, or another approach from the field of machine learning may be used. Feature recognition can be performed by an evaluating device. This may be an additional calculator or a cloud-based calculating structure. Evaluation may be performed directly after or while flying, or also offset in time and position.

By determining the positions and/or locations of the features from the position and location information of the images which contain the features, a difficult-to-access object to be detected can be detected with little time effort and with, for example, minimum risk to humans. Instead of climbers, a drone can take the pictures using which a model of the object can be set up. Based on the model, fully automated or autonomous inspection flights can subsequently be performed. By recording a set of images, image evaluation methods, for example for generating depth information, can be applied. Additionally, a statistical evaluation of results resulting from evaluating individual images, allows indicating result qualities, using which a measure of the precision of the model can be provided, for example.

This allows deciding at which distance a drone has to fly to the object in order to avoid collision as safely as possible. The better the model quality, the closer a drone could automatically approach in order to take particularly high-resolution images of the object, using which a comprehensive evaluation can be carried out, for example with regard to micro-cracks.

Figure 2:
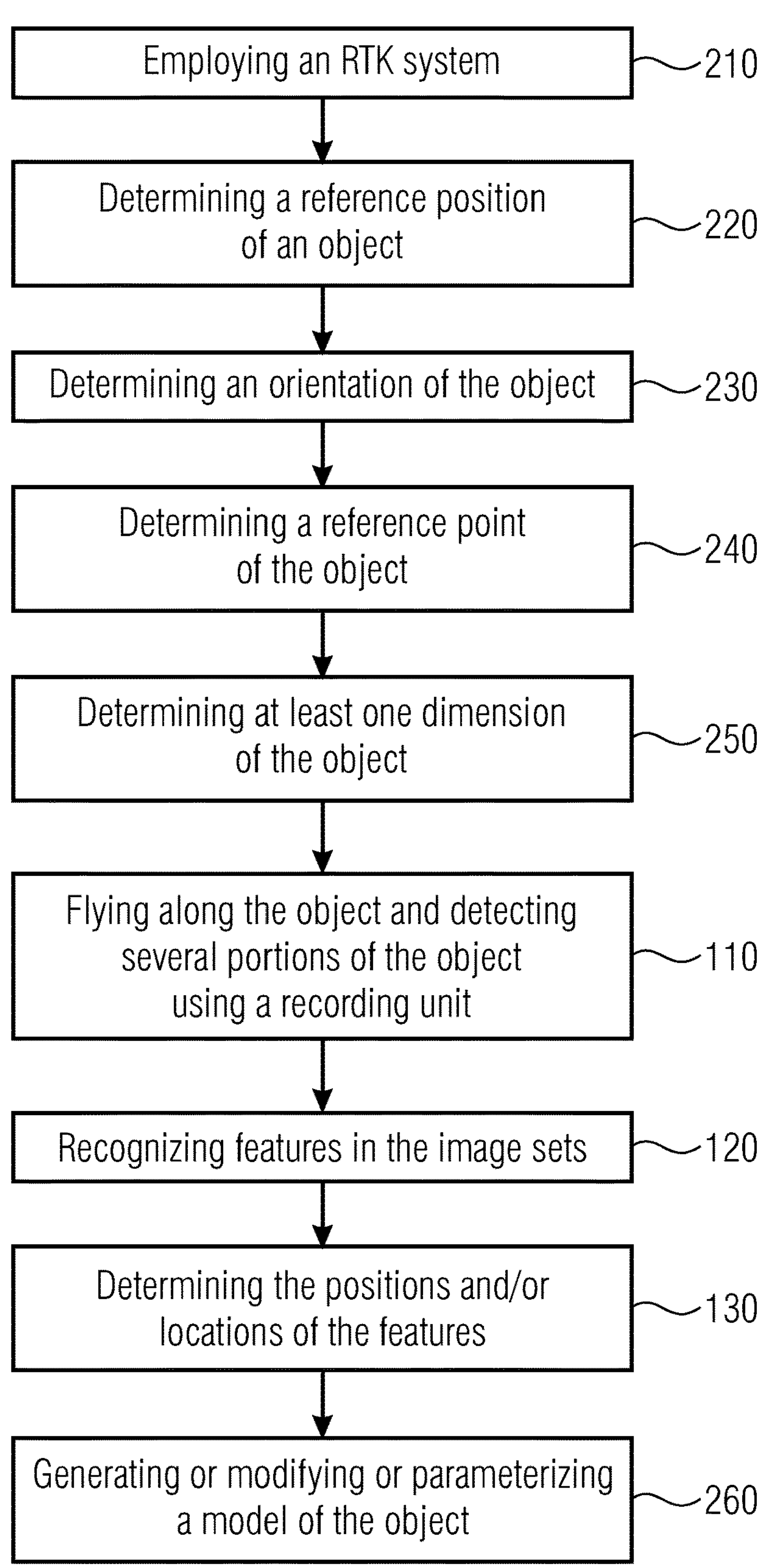
FIG. 2 is a flow chart of detecting an object with additional optional steps in accordance with an embodiment of the present disclosure.

FIG. 2 shows a flow chart of detecting an object with additional optional steps in accordance with an embodiment of the present disclosure. The necessary steps in FIG. 2 thus correspond to the steps in FIG. 1.

FIG. 2 additionally shows step 210 which comprises employing a real-time kinematics (RTK) system for correcting the position and location information of the recording unit. The RTK system allows improving the precision of position determination, without integrating complicated technology for position determination into the recording unit.

Step 220 comprises determining a reference position of the object. The reference position is determined by evaluating an amount of position information of the recording unit, the amount of position information being derived from a trajectory of movement of the recording unit. The reference position may, for example, be the object center. This allows the recording unit to fly to the position of the object in an automated manner, for example to detect it optically.

Step 230 comprises determining an orientation of the object. The orientation is determined by an evaluation of the reference position, for example determined before, of the object and position information of the recording unit, the recording unit being positioned in correspondence with the orientation of the object at the time of recording the position information. The recording unit can be placed on a connecting line between recording unit and reference position, for example the object center, which is at right angles to the front side of the object, and the orientation, like location or alignment of the object, can be calculated from the reference position and the position of the recording unit. Determining the orientation can be important in the case of moveable objects, like a wind turbine or a crane, since it may have changed between two inspections. An advantage of determining the orientation in accordance with the disclosure is that there is no additional effort spent for adapting the orientation of the object. The nacelle of a wind turbine, for example, does not have to be brought to a certain orientation first for a method, for example. A crane in a residential area between high-rise buildings, for example, cannot be moved strictly to the north, because there is already a building or another crane, for example. The method according to the disclosure can thus save time and resources and at the same time be suitable for a wide range of applications.

Further step 240 comprises determining a reference point of the object. This is performed by placing the recording unit at the reference point and subsequently evaluating the position information of the recording unit. The reference point may be a point from the two- or three-dimensional space, but also a scalar quantity, for example a height above sea level. This can be used to determine a reference height for subsequently flying along the object with the recording unit. The recording unit may, for example, be placed at the lowest point of the object to them automatically fly along the object along its entire height, when, for example, the height of the object is known.

Further step 250 comprises determining at least one dimension of the object. The dimension is determined by evaluating a reference point of the object, and the position of one or more features. The height of the object can be determined by evaluating the position of the highest point of the object, using the reference point determined before, in the form of a reference height, for example. Further applications are conceivable in accordance with the disclosure. Thus, a lateral dimension of a container ship, for example, that is to be cannibalized, can be determined using a drone and a reference point, for example in the form of the outermost point of the bow and a determination of the position of the outermost point of the ship aft. This allows quickly measuring a ship having a length of several hundred meters, for example to determine ideal cutting planes for dismantling.

The further steps 110, which comprises flying along the object and detecting several portions of the object using at least one recording unit, 120, which comprises recognizing features in the image sets, and 130, which comprises determining the positions and/or locations of the features, correspond to the steps of FIG. 1. For a more detailed description, reference is thus made here to the description of FIG. 1.

In embodiments, step 250 may also contain steps 110, 120, and 130. However, step 250 may also be performed before performing, or performing again steps 110, 120, and 130, with or without these steps. Performing steps 110, 120, and 130 may, for example, be a way of determining the position of one or more of the features of step 250. When the position is known, performing steps 110, 120, and 130 for determining at least one dimension of the object may also be omitted. Omitting steps 110, 120, and 130 for determining the dimension, however, does not exclude performing the steps for determining positions and/or locations of other features, for example.

Further step 260 comprises generating or modifying a model, or parametrizing a generic model, like a CAD model of the object, for example for determining waypoints for an autonomous flight. The model can be set up using the positon and/or location information of the features. Due to the model of the object, subsequently drone flights can, for example, be performed in an automated manner or autonomously. Thus, a considerable amount of time can be saved when inspecting the object.

The steps shown, 210 to 250 and 260, are to be understood to be optional. Exemplarily, when knowing the reference positon, step 220 can be omitted, but step 230, that is determining an orientation of the object, can nevertheless take place using the known reference position. Reversely, determining the orientation using step 230 can be omitted but the reference position be determined with step 220.

Figure 3:
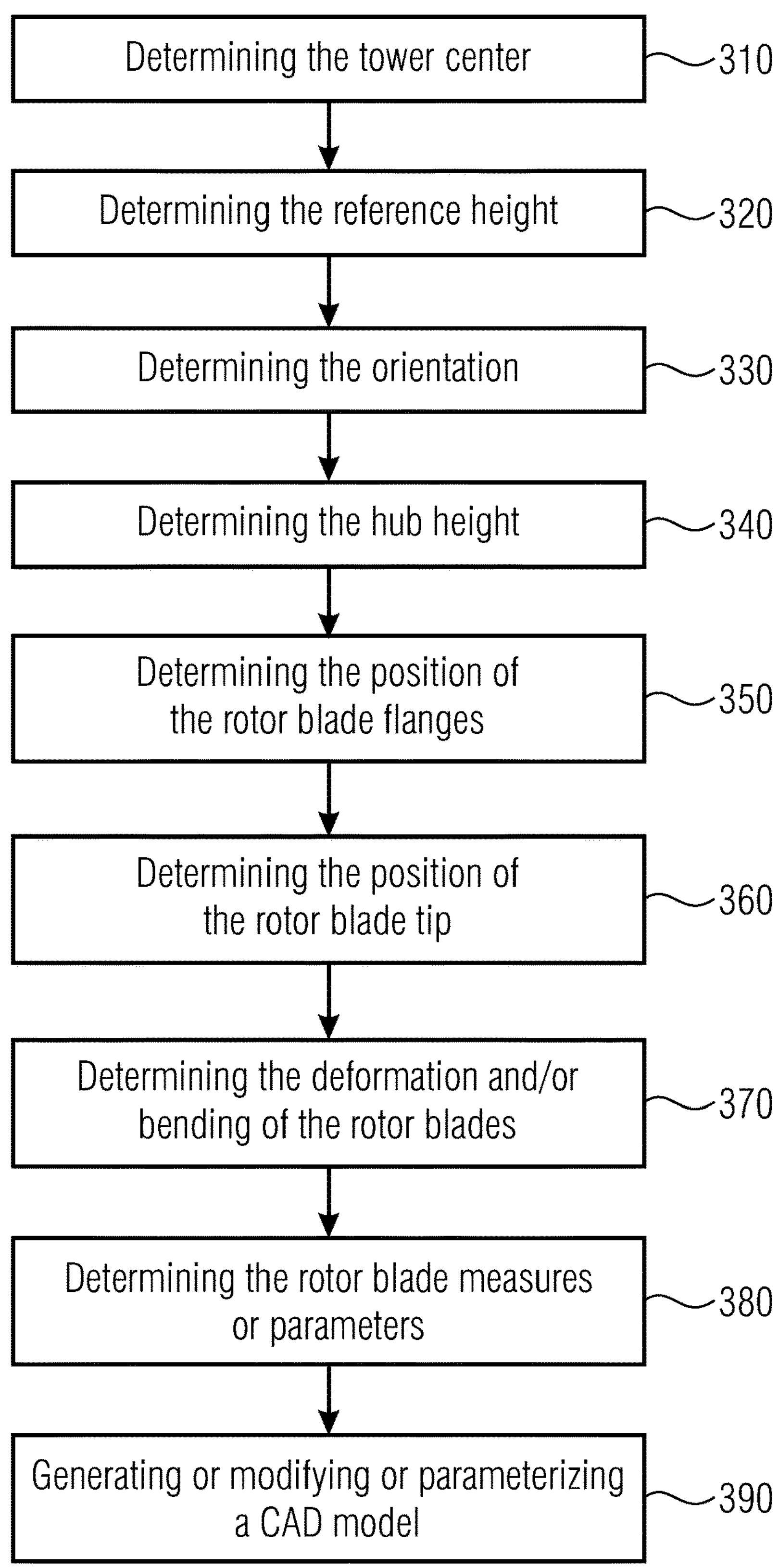
FIG. 3 is a flow chart of detecting a wind turbine in accordance with an embodiment of the present disclosure.

FIG. 3 shows a flow chart of detecting a wind turbine in accordance with an embodiment of the present disclosure. FIG. 3 exemplarily shows a flow of generating a calibration data set of a wind turbine for the autonomous flight of a drone along a wind turbine.

Step 310 comprises determining the tower center of the wind turbine. Determining the tower center comprises at least partly circling the tower along the outer wall of the tower using the recording unit and recording the positions of the recording unit when circling the tower. Furthermore, positon subsets are formed from three points each, wherein the three points comprise a predetermined distance, for example, as equal as possible, to one another.

Additionally, a set of centers of gravity of triangles can be determined from a plurality of the position subsets, wherein each triangle is formed from the three points of a position subset. Thus, the center of the tower is calculated from the average of the centers of gravity. Alternatively or additionally, an amount of circle centers can be determined from a plurality of the position subsets, wherein each circle center is determined from the three points of a position subset, using the general circle equation. Thus, the center of the tower is calculated from the amount of circle centers. Alternatively or additionally, a set of circumcircle centers can be determined from a plurality of positon subsets, wherein each circumcircle center is the center of a circumcircle of a triangle which is formed from the three points of a position subset. In this case, the center of the tower is calculated from the amount of circumcircle centers.

In other words, the tower center can be determined by the recording unit, like a drone, for example. Due to the unknown, or only imprecisely known geographical coordinates of the wind turbine, determining the tower center of the wind turbine may be entailed to calibrate a flight path of the drone along the wind turbine, for example for an autonomous flight. The method according to the disclosure can be used to determine the center of the tower with a centimeter accuracy, for example. A single orbit or circling around the tower by the recording unit, for example, can record the trajectory of movement of the recording unit. The distance to the tower and the speed of circling may thus be selected, for example, to be slow such that there is a sufficient signal intensity, for example between the drone and a real-time kinematics system for improving the position precision, or between the drone and a communication unit, for example a remote console. In wind turbines, circling may take place on the foundation base, wherein for the case of offshore wind turbines, circling may also take place on the gangway of the wind turbine. Thus, when evaluating, the difference in height of the gangway, for example between the gangway and foundation top edge or water level, can also be taken into consideration. The tower center is calculated from a series of recorded position information, for example positions, like GPS support points, for example. Three points can be selected from the position information of the trajectory of movement, which comprise a predetermined, like similar, or as close as possible distance to one another so that the three points form an equilateral triangle, for example. The center, or center of gravity of the triangle can then be calculated from these three points. Calculating the centers from three points each with similar distance to one another can be performed for several, or all, recorded position information, for example. The average can be calculated from the detected centers or centers of gravity in order to calculate the tower center, or center. Alternatively or additionally to determining the tower center using the centers of gravity of the triangles, for example, circle centers can be determined from the respective three points for several or all recorded position information, from the general circle equation based on the respective three points, or circumcircle centers from the circumcircles of triangles which are formed from the respective three points.

Step 320 comprises determining the reference height or the basement (foundation) of the wind turbine. Determining is performed by placing the recording unit at the reference height, for example any point on the basement or the reference point, for example, and subsequently evaluating the position information of the recording unit.

Determining the reference height can represent the second measurement at the wind turbine, or wind wheel. The reference height can be an example of a one-dimensional reference point. For example, the reference point is a height above sea level, which forms a height reference, or reference height for the wind turbine. Determining the reference height, for example determining the height as zero level, can be used for subsequently determining the tower height of the lower flange or concrete edge of the tower. Placing the recording unit at the reference height may comprise placing the recording unit, for example a drone, on the top edge of the foundation of the wind turbine. Placing the recording unit may take place after previous, for example, one-time circling of the top edge of the foundation. The recording unit may comprise a GPS or positioning system, like Preciwave.

In offshore wind turbines, the reference height may also be the height of the gangway to form the region between the foundation and the lower tower flange. In other words, instead of top edge of the foundation, the gangway can be used for determining the reference height. In this case, the difference in height, for example between gangway and foundation, or gangway and water surface, can be considered for the reference height or further steps which are based on the reference height.

Further step 330 comprises determining the orientation of the wind turbine. Determining the orientation is performed by evaluating a reference position, for example the tower center of the wind turbine, and position information of the recording unit, for example a drone, wherein the recording unit, at the time of recording the position information, is positioned in correspondence with the orientation of the wind turbine.

Determining the orientation of the wind turbine can form the third measurement at the wind turbine. The orientation of the wind turbine may be the orientation of the nacelle of the wind turbine. The recording unit may be placed in front of the wind turbine in correspondence with the orientation of the nacelle, that is, for example, such that the connecting line between the drone and the nacelle is arranged at right angles to the rotor blades. The orientation of the nacelle can be determined from a known reference position of the wind turbine, like the tower center, and the position of the recording unit, for example. The orientation may be the azimuth or the heading of the nacelle or wind turbine, which is determined, for example, relative to the north direction or another reference point. If the orientation only has to be determined roughly, determining the position for the recording unit may, for example, be carried out on foot, wherein the recording unit can be parked briefly in front of the wind turbine, in correspondence with the orientation of the nacelle, for determining, for example, the GPS position of the recording unit. After determining the orientation, a calibration flight may follow.

Further step 340 comprises determining the hub height of the wind turbine. Determining the hub height is performed by evaluating the reference point, for example the height as zero point, and the position of one or several features.

In other words, after determining the tower center, the reference height and the orientation of the wind turbine, for example, the hub height can be determined. When there is a priori information for the hub height, this may be verified. The recording unit, for example drone, can fly to the hub of the wind turbine and take pictures of the hub tip. The distance between the recording unit and the wind turbine may be below a fixed threshold value, for example less than 20 m. The flight of the recording unit can be performed automatically, for example by determining waypoints, when the approximate hub height is known before the flight. The flight of the recording unit may additionally be performed manually, for example by hand, so that the recording unit is flown at the height of the hub tip by a or the remote control of the recording unit. Evaluating the images, or recognizing the feature hub height from the images, may be performed manually, for example by hand, or in an automated manner, for example using artificial intelligence (KI).

Further step 350 comprises determining the position of the rotor blade flanges. Determining the position of the rotor blade flanges comprises determining a first straight between the position of a first point of the rotor blade flange identified in an image, in short flange point, and the position of the recording unit and a second straight between the position of a second point of the rotor blade flange, opposite the first point, identified in the same image and the position of the recording unit. Thus, for determining the first and second straights, apart from the position of the recording unit at the time of recording the image and the identified positions of the points of the rotor blade flanges, the location of the recording unit at the time of recording the image, and characteristics of the recording unit may also be taken into consideration. In addition, a further straight is determined, which is in the center between the first and second straights. A plurality of further straights is determined for a set of images of the rotor blade flange and the position, like the center of the rotor blade flange or, in short, flange center, is determined from the plurality of further straights.

The step may further comprise determining the location of the rotor blade flanges. Determining the location of the rotor blade flanges comprises identifying two opposite points of the rotor blade flange in an image, wherein a direction vector of a connecting straight between the positions of the two opposite points of the rotor blade flange is determined. Thus, a plurality of direction vectors of connecting straights for a set of images of the rotor blade flange is determined and an amount of possible normal vectors of the rotor blade flange is calculated from the plurality of direction vectors of the connecting straights by forming the cross product of the direction vectors of the connecting straights in pairs. A normal vector of the rotor blade flange is calculated from the amount of possible normal vectors.

In other words, for determining the position and location of the rotor blade flanges, a rotor blade flange, or in short flange, can be considered or approximated to be a circular structure, like a circle, which comprises a position in space, like a center, and a location in space, like an orientation. The circle will subsequently be referred to as flange circle. A similar method like for determining the position of the rotor blade tips can be used for determining the position of the rotor blade flange. Two rays in space, like mathematical straight lines, can be calculated for each image and flange. These touch the flange circle at two opposite points and intersect, for example exactly, at the position of the recording unit, like the camera of the recording unit. A ray can be calculated, which passes precisely in the center of the two rays calculated before. It may pass through the center of the flange circle. The position of the flange center can be determined from these center rays per image and flange, similarly to determining the position of the rotor blade tips, like similarly to the blade tips, for example.

Determining the location of the flanges in space in accordance with the disclosure in embodiments is based on the idea that the location of a circle in space is determined, or can be indicated by the normal vector of the circular plane. In the case of the flanges, this normal vector may also be the direction vector at which the rotor blade, like a wing, leaves the hub. Another idea of the method is the fact that it can be assumed that the two image points, determined by a user or automated evaluation, per flange and image are in a plane parallel to the image plane. When assuming any such plane, for example, the direction vector of the connecting straights through the two points can be calculated. Since such, like all, direction vectors are also in the circular plane of the flange, the normal vector of the circular plane can be calculated from this. The cross products in pairs can be applied to the direction vectors and the results can be reduced to a single normal vector and a result quality using statistical methods.

Additionally, the flange diameter can be determined in step 350. It can be determined from the flange center, determined before, for example, in which plane parallel to the image plane the two identified flange points are located. The distance between the two points can be calculated from this. The average of the flange diameter can be calculated from the distance between the two points, averaging may, for example, be performed using a plurality of distances of two respective flange points of the rotor blade flange from a set of images which comprise the rotor blade flange and in which two respective points of the rotor blade flange have been identified.

In other words, in summary, determining the position of the rotor blade flanges, like the wing root of the wind turbine, can comprise photographing the flanges. In addition, apart from the position of the rotor blade flanges, the size and width of the rotor blade flange can be determined, like by the flange diameter, and the rotor blade inclination relative to the tower, like by the normal vectors of the rotor blade flange.

Step 360 comprises determining the position of the rotor blade tip or tip of the rotor blade. Determining the position of the rotor blade tip comprises determining a straight between the position of the rotor blade tip, identified in an image, and the respective position of the recording unit. Thus, the location of the recording unit at the time of recording the image, and characteristics of the recording unit can also be taken into consideration when determining the straight, apart from the position of the recording unit at the time of recording the image and the identified position of the rotor blade tip. In addition, a plurality of straights for a set of images of the rotor blade tip is determined and the plurality of straights is evaluated in pairs. A point of intersection is calculated for each pair of straights and the position of the rotor blade tip is calculated from an amount of points of intersection of the pairs of straights.

In other words, in this step, the position of the rotor blade tip, like the blade tips, or wing tips can be determined or verified in case there are information on positions of the rotor blade tips. The recording unit, like the drone, can fly to the rotor blade tips and take pictures. The distance between the recording unit and the wind turbine can be below a threshold value, like below 20 m. Flying to the recording unit can take place in an automated manner or autonomously, for example when knowing the hub height and the rotor blade length, by determining the position of the rotor blade tip to be flown to by a waypoint method. The flight of the recording unit may also take place manually, like by hand, for example in correspondence with step 340.

Determining the positions of the rotor blade tips, or wing tips, can comprise calculating a ray, like of a mathematical straight in space for each image. Calculating the ray may take place using the position and orientation of the recording unit, like of the camera of the recording unit, the characteristics of the recording unit, like aperture angle and number of pixels of a camera of the recording unit and the identified position of the rotor blade tip. The rays of a rotor blade tip calculated by these data could meet all at the same position, for example at the same location, of the position of the rotor bade tip, in the case of ideal conditions, for example in the case of exactly known optical parameters and error-free identified positions of the rotor blade tips. In order to allow a good calculation of the position of the rotor blade tips in the case of non-ideal conditions, in accordance with the present disclosure, all rays, for example of a rotor blade tip, can be compared in pairs. An approximate point of intersection, like the center of the shortest connecting line, for example, can be calculated here. Poor pairs of rays, like pairs of rays not resulting in a sensible result for the position of the rotor blade tip, can be discarded, that is not taken into consideration, for example. A way of recognizing poor pairs of rays may be comparing the point of intersection to an image taken. If a pair of rays intersects outside the image region, this point of intersection can be discarded, for example, when the rotor blade tip was identified correctly within the region of the image. A cloud of points, like an amount or plurality of points of intersection, can be formed from the points of intersection, from which a center and a result quality can be calculated using statistical methods. The calculated center can describe the position of the rotor blade tip.

Alternatively or additionally, the positions of the rotor blade tips can be determined as follows:

The starting point can be the amount of straights, determined as discussed before, between the position of the rotor blade tip identified in an image and the respective position of the recording unit in the three-dimensional space, the point of intersection of which, for example, determines the position of the rotor blade tip. In simple words, a number of rays in 3D results, the "point of intersection" of which is searched.

In a practical evaluation, some or more of these straights or rays may be skewed and thus not have a common point of intersection. Expressed differently, the rays may be skewed in reality and not intersect at any point. Instead, a point P can be searched, which is closest to a "point of intersection".

Two definitions can be used here and the corresponding processing steps be carried out, for example:

"minimum distance": The minimum distance of a 3D point to a ray or straight, for example, is the length of the perpendicular line between point and ray or, for example, point and straight line.

"sum of the squares of the minimum distances": The minimum distances to a point are calculated and squared for the rays given. The sum is then formed over these squared distances.

The searched point is exactly that point that minimizes the sum of the squares of the minimum distances.

Using an optimization algorithm, such as the "limited-memory Broyden-Fletscher-Goldfarb-Shanno" algorithm (L-BFGS), the point P can be determined, for example.

The point P in turn can be used as a result for the position of the rotor blade tip, for example.

Further step 370 comprises determining the deformation and/or bending of the rotor blades. Determining the deformation and/or bending of the rotor blades is performed by an approximation of the path of the rotor blades using a mathematical function, like linear, exponential or logarithmic.

In other words, determining the deformation and/or bending of the rotor blades, can be performed by a generic mathematical method. The deformation may comprise a deformation starting at the second half of the rotor blade. By determining the position of the rotor blade flange, for example in accordance with step 350, and determining the position of the rotor blade tip, for example in accordance with 360, the real path of the rotor blade or wing can be approximated.

Further step 380 comprises determining the rotor blade measures or parameters. The step may comprise determining the largest rotor blade thickness and/or determining the largest rotor blade width. The rotor blade thickness and/or rotor blade width can be determined while simultaneously determining the distance from the rotor blade flange. Determining the rotor blade measures can, after determining the position of the rotor blade tips and the position of the rotor blade flange and its diameter, further comprise determining any positions, for example in accordance with step 360. Two opposite points on the rotor blade edges, like blade edges, can be selected for this so that a resulting distance determination yields the blade width. The respective position and location, for example, can be determined from this.

Steps 310 to 380 can additionally comprise calculating the following parameters or features:

tower center, like the exact tower position
hub height, like height of the rotation axis
inclination of the rotor blades
orientation of the rotor blade flanges their centers
length of the rotor blades deformation and/or bending of the rotor blades
positioning, like rotation of the rotor blades
angle of inclination (pitch angle) of the rotor blades
orientation of the wind turbine or the hub These parameters can serve for correcting a waypoint calculation, for example the waypoint calculation for an inspection flight of a drone.

Further step 390 comprises generating or modifying a model or parametrizing a generated model, like a CAD model of the wind turbine. The model is generated, modified or parametrized using the position and/or location information of the features. The model can be generated, modified or parametrized from calibration data, like data from steps 310 to 380. In addition, further parameters can be established from the same method. Further parameters can comprise parameters of the rotor blades, like the rotor blade thickness and rotor blade width, for example. Generating a model, for example, is only entailed if there is no model of the entire wind turbine, or the rotor blades, for example. Using the parameters established, a model, like a 3D model of the wind turbine, consisting of tower and rotor blades, for example, can be generated and/or modified in that it matches reality as precisely as possible, for example. In addition, a generic 3D model of the wind turbine can be parametrized, for example by a generic method. Waypoints for an autonomous flight can then be calculated from the generic model, for example.

According to embodiments of the present disclosure, the following quantities can be known or derived from steps 310 to 380:

position of the rotor blade tips,
positon of the flange centers,
location, like orientation of the flange circles in space, like normals of the flange circles,
diameter of the flange, and
rotor blade width and position of the rotor blade.

Further quantities can be derived from these quantities. Both the rotor blade tips and the flange centers can each define a plane which a normal vector can be associated to, and a respective center can be calculated, for example as a circle center. The normal vector in both cases corresponds to the orientation of the hub, like of the wind turbine, or the direction of the rotation axis, like of the common rotation axis of the rotator blades, for example. The orientation, like the heading and upwards-inclination of the rotation axis can be calculated from this. The calculated center is located on the rotation axis and, using the same, its height, like the height of the hub, can be determined. The rotation of the wind turbine, like the positioning of the rotor blades (like deviation from 6 o'clock positioning) can be calculated from the comparison of the rotor blade tips or rotor blade flange centers including their center. Alternatively or additionally, the rotation can also be calculated from the normal vectors of the flange circles. The diameter of the hub can be calculated or estimated by the distance of the rotor blade flange centers. The deviation of the established position of the rotor blade tips from the expected position can be used for determining the rotor blade bending. A generic CAD model, for example, can be parametrized by the calculation of the wing widths and positons.

Figure 4:
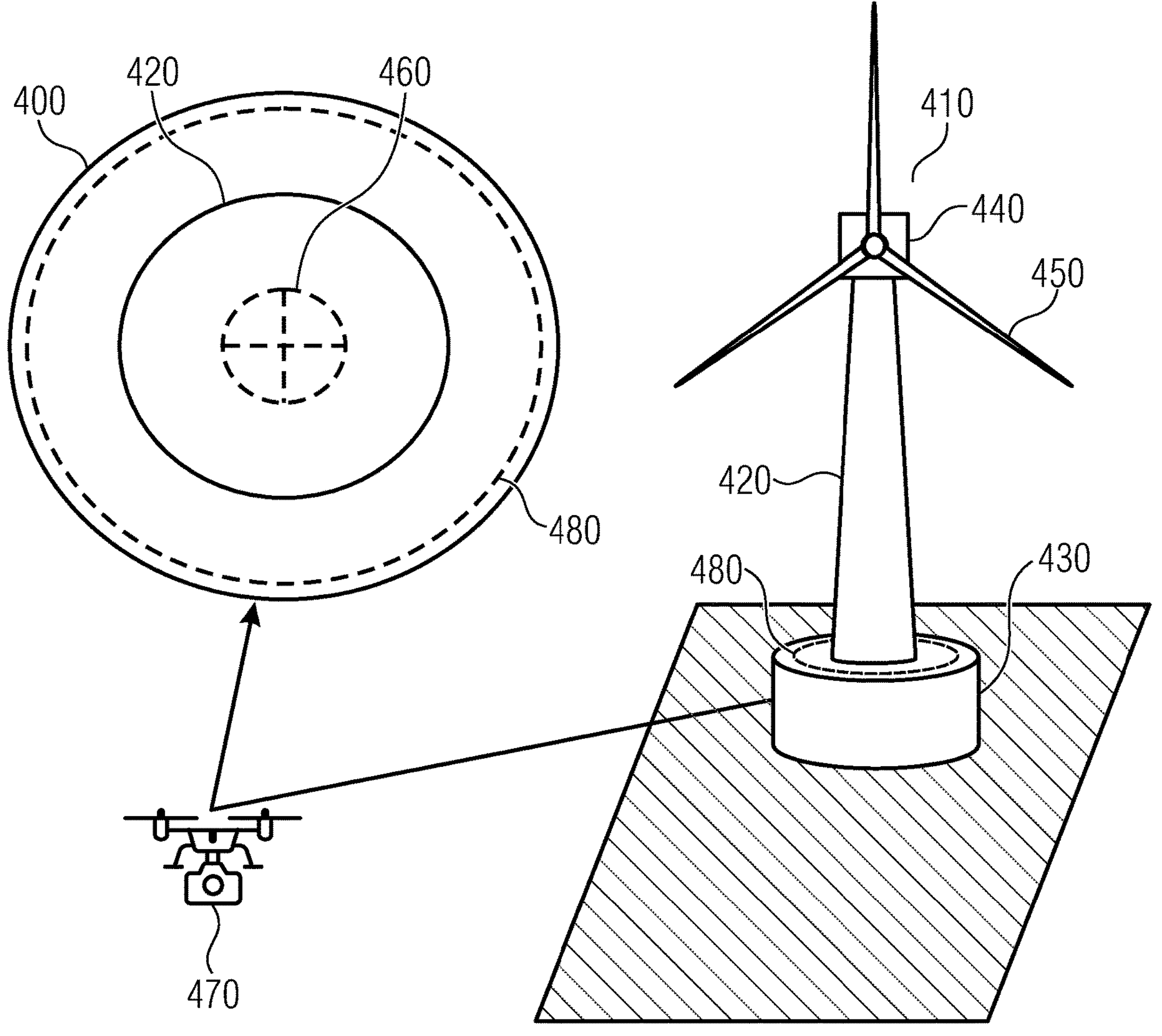
FIG. 4 is a schematic side view of a wind turbine with a schematic top view of a section of the wind turbine and a trajectory of movement of the recording unit in accordance with an embodiment of the present disclosure.

FIG. 4 shows a schematic side view of a wind turbine with a schematic top view of a section of the wind turbine and a trajectory of movement of the recording unit in accordance with an embodiment of the present disclosure. FIG. 4 shows step 310 from FIG. 3, for example. FIG. 4 shows a schematic top view 400 of a section of a wind turbine, and a schematic side view 410 of the wind turbine. The wind turbine comprises a tower 420, a foundation 430, a nacelle 440 and rotor blades 450. The tower center 460 is marked in the top view 400. A trajectory of movement 480 of the recording unit 470 on the top edge of the foundation is also shown. The positions of the recording unit 470 when circling the tower 420 on the trajectory of movement 480 are recorded for determining the tower center 460. Subsequently, position subsets are formed from three points each, wherein the three points comprise a predetermined, as equal as possible, for example, distance from one another. Furthermore, an amount of centers of gravity of triangles can be determined from a plurality of the position subsets, wherein each triangle is formed form the three points of a position subset and the tower center 460 is calculated from the average of the centers of gravity. Alternatively or additionally, an amount of circle centers can be determined from a plurality of the position subsets, wherein each circle center is determined from the three points of a position subset, using the general circle equation. The tower center 460 here is calculated from the amount of circle centers. Alternatively or additionally, an amount of circumcircle centers can be determined from a plurality of the position subsets, wherein each circumcircle center is the center of a circumcircle of a triangle which is formed from the three points of a position subset. Thus, the tower center 460 is calculated from the amount of circumcircle centers. The triangles may be, for example, equilateral or isosceles triangles.

Figure 5:
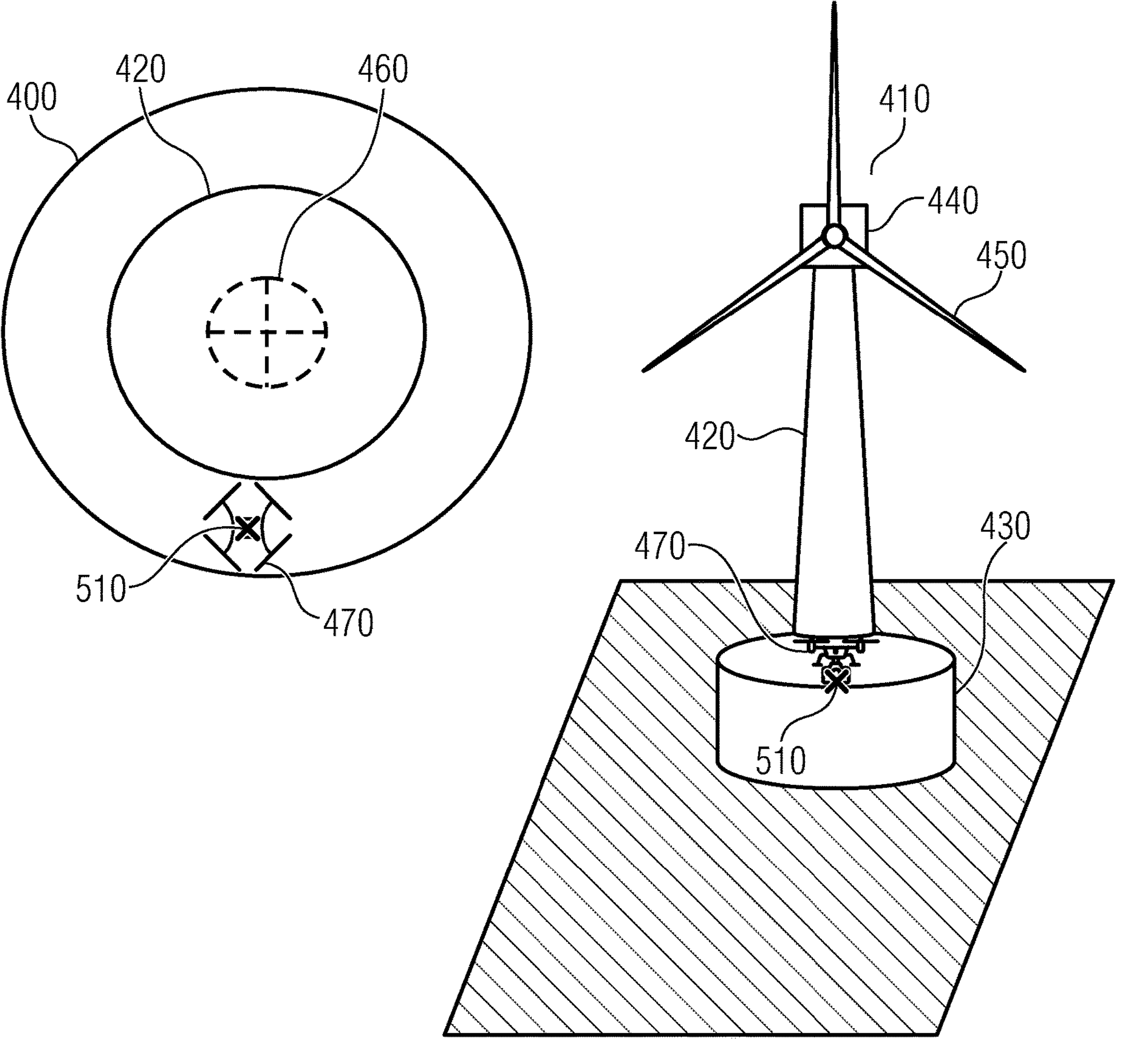
FIG. 5 is a schematic side view of a wind turbine with a schematic top view of a section of the wind turbine in accordance with an embodiment of the present disclosure.

FIG. 5 shows a schematic side view of a wind turbine with a schematic top view of a section of the wind turbine in accordance with an embodiment of the present disclosure. FIG. 5 shows step 320 from FIG. 3, for example. FIG. 5 corresponds to FIG. 4, except for the position of the recording unit and the lacking trajectory of movement. FIG. 5, when compared to FIG. 4, shows a reference point 510. The recording unit is placed at the reference point for determining the reference point, like the reference height or the height as zero point, of the wind turbine. Subsequently, the position information of the recording unit is evaluated. Thus, a reference height can be determined for the wind turbine, using which the recording unit can be oriented, for example to fly to the rotor blade tips or to the hub in an automated manner. The reference point may be a one-dimensional quantity, like a reference height. In this case, the reference point may be any point with the same height relative to the tower, on the top edge of the foundation.

Figure 6:
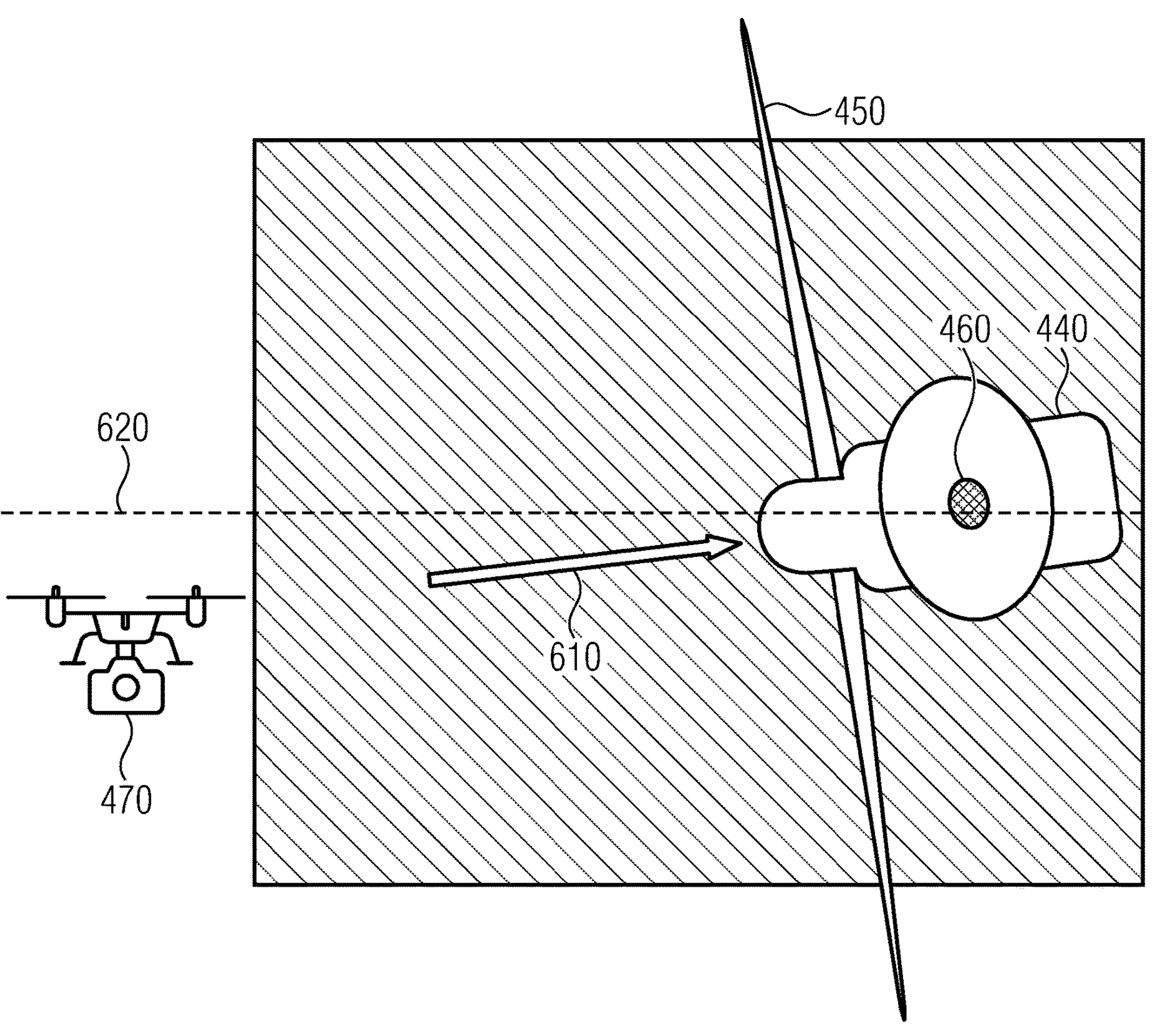
FIG. 6 is a schematic top view of a wind turbine in accordance with an embodiment of the present disclosure.

FIG. 6 shows a schematic top view of a wind turbine in accordance with an embodiment of the present disclosure. FIG. 6 shows step 330 from FIG. 3, for example. FIG. 6 shows the known elements from FIG. 4 and FIG. 5, and an orientation 610 of the wind turbine relative to the tower center 460 and a reference axis 620, like an axis directed to the north. Determining the orientation of the wind turbine comprises evaluating the tower center 460 and position information of the recording unit 470, wherein the recording unit is positioned in correspondence with the orientation 610 of the wind turbine at the time of recording the position information. Thus, an orientation 610 of the wind turbine can be determined in a short time and without further measuring devices, except for the recording unit 470. A straight, like the direction vector of a connecting straight of the two points can be determined from the tower center 460 and the position of the recording unit. The angle of this direction vector, like the straight to the reference axis 620 can be used for evaluating the orientation 610.

Figure 7:
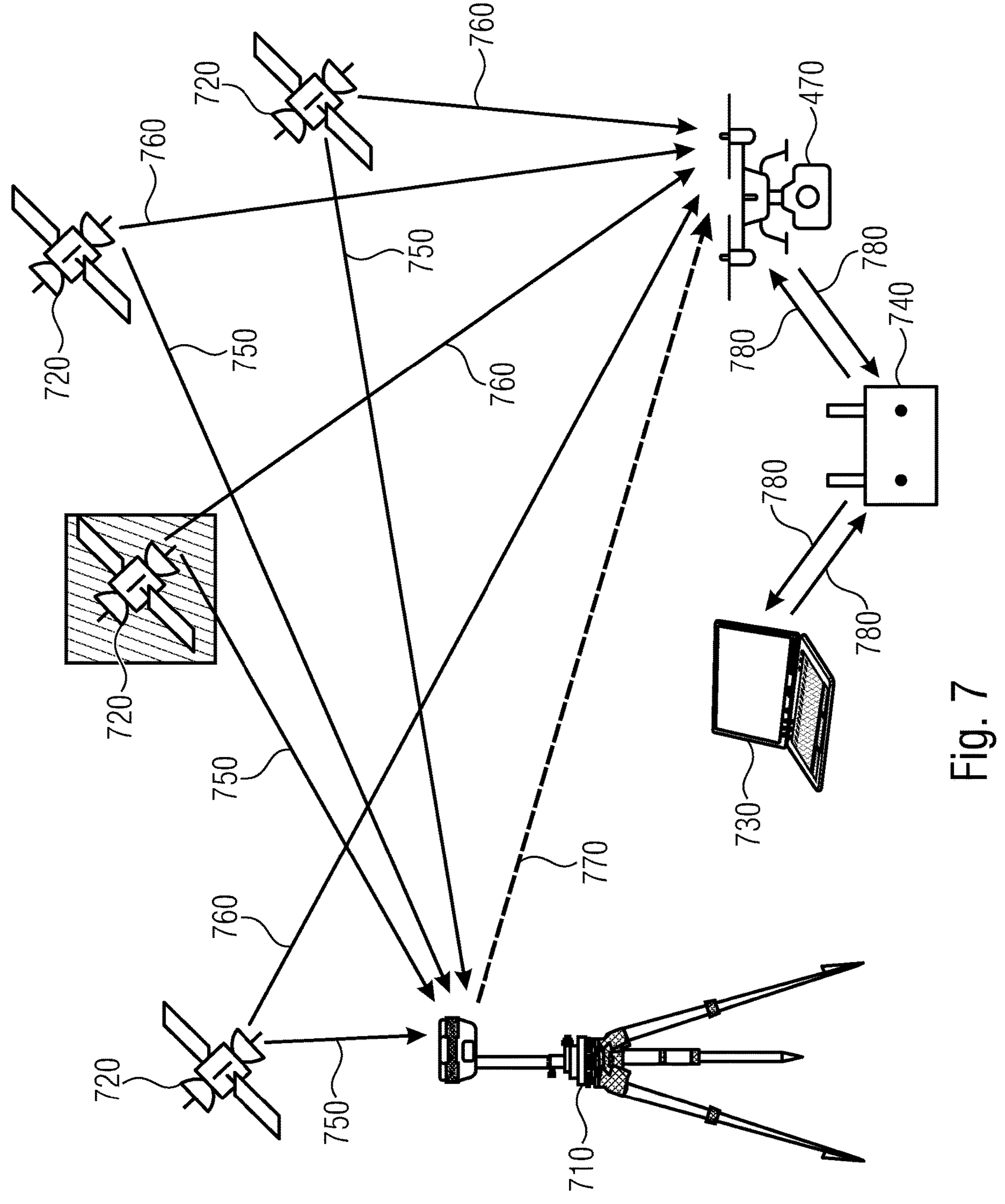
FIG. 7 is a schematic illustration of an exemplary flow of information between real-time kinematics system, recording unit, evaluation device, and communication unit in accordance with an embodiment of the present disclosure.

FIG. 7 shows a schematic illustration of an exemplary information flow between a real-time kinematics system, recording unit, evaluation device and communication unit, like a remote console, in accordance with an embodiment of the present disclosure. FIG. 7 shows the recording unit 470, a real-time kinematics system 710, like RTK, satellites 720, an evaluation unit 730 and a communication unit 740. The real-time kinematics system obtains information on its own position from the satellites 720, for example, the information flow is indicated by arrows 750. The recording unit 470 can also obtain information on its own position via the satellites 720, the information flow is indicated by arrows 760. The real-time kinematics system can be used to improve the position data of the recording unit, indicated by an arrow 770. Communication between the recording unit 470 and the evaluation unit 730 is done via the communication unit 740, indicated by arrows 780. Communication, for example between the recording unit and communication unit, can take place in an encrypted manner. The recording unit can additionally comprise a control unit. This can provide a mobile and inexpensive way of generating precise position and location information of the wind turbine, without integrating expensive, complicated and, for example, heavy GPS modules into the recording unit 470, to generate sufficiently precise position data.

Figure 8:
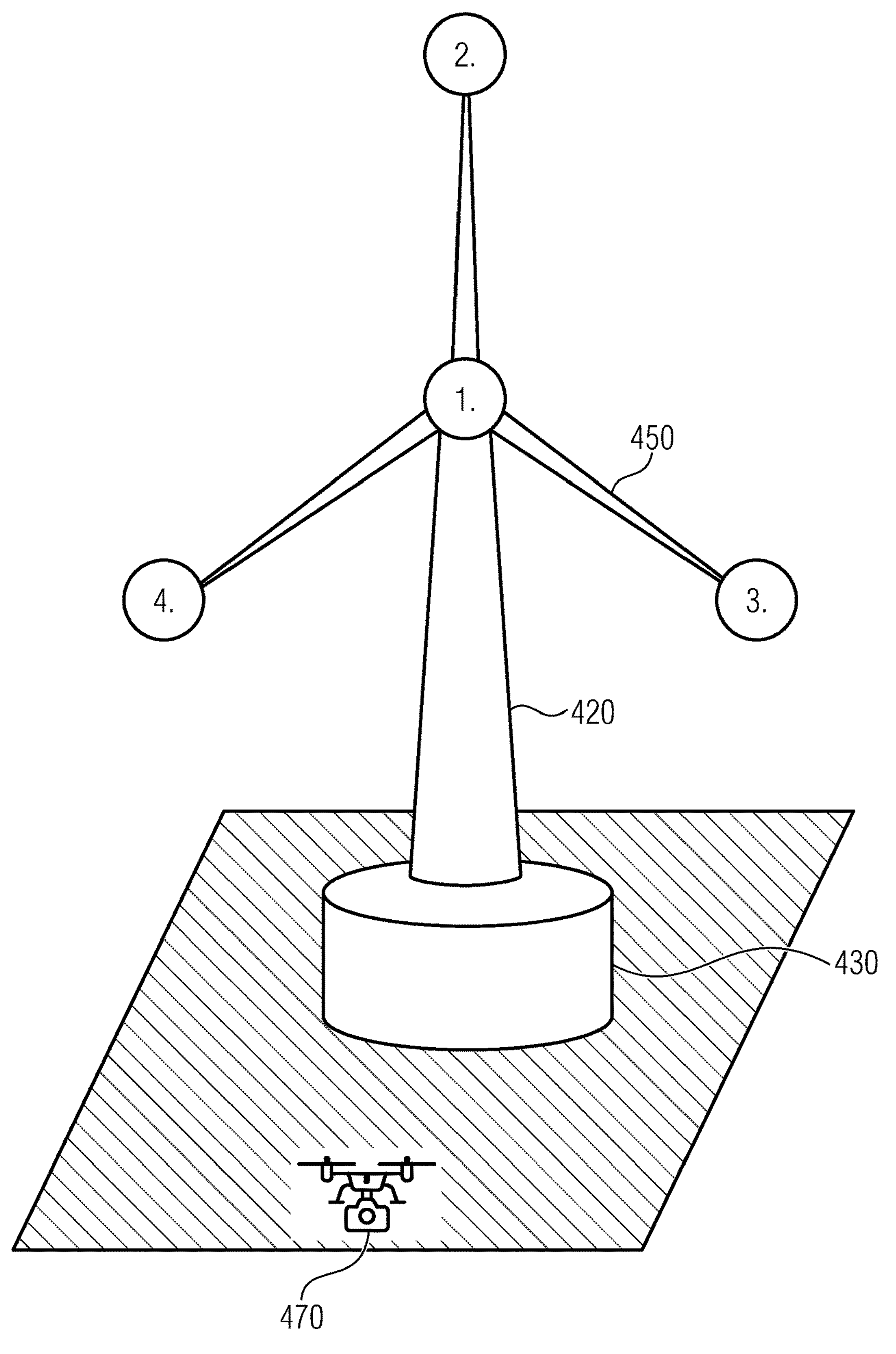
FIG. 8 is a schematic side view of a wind turbine with an exemplary order of detecting the recording unit in accordance with an embodiment of the present disclosure.

FIG. 8 shows a schematic side view of a wind turbine with an exemplary order of detecting the recording unit in accordance with an embodiment of the present disclosure. FIG. 8 shows the known elements from FIG. 4 and FIG. 5. Additionally, a potential order of flying by the recording unit is indicated using numbers 1 to 4. After determining the reference position, the reference point and the orientation of the wind turbine, at first the hub (1.) can be flown to in an automatic or autonomous manner, for example for determining the tower height, and subsequently the rotor blade tips. Further portions can, for example, be detected optically on the way to the rotor blade tips. The positioning of the rotor blades is to be mentioned exemplarily, an orientation to the 6 o'clock position or any other positions is possible.

Figure 9:
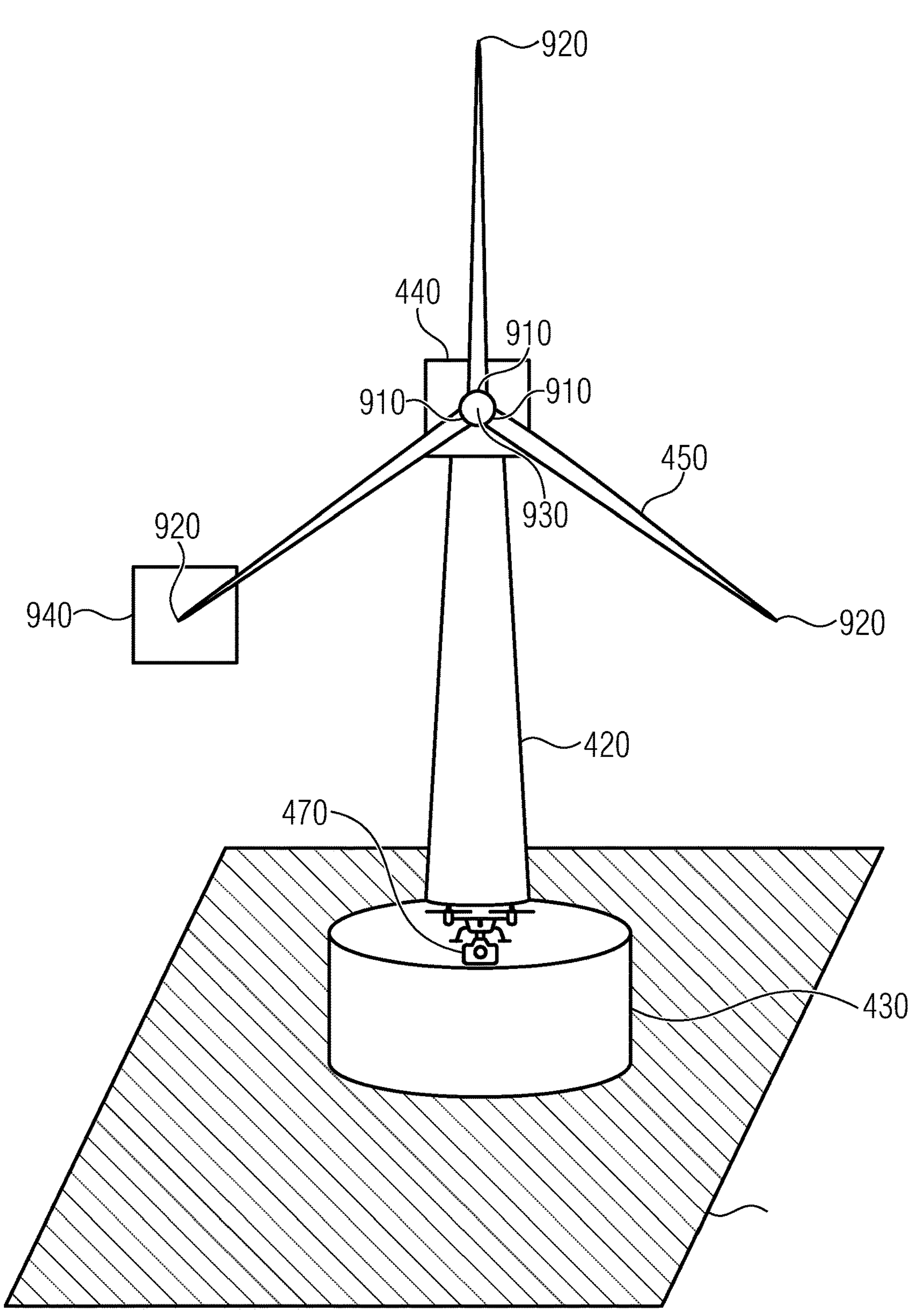
FIG. 9 is a schematic side view of a wind turbine with exemplary features in accordance with an embodiment of the present disclosure.

FIG. 9 shows a schematic side view of a wind turbine with exemplary features in accordance with an embodiment of the present disclosure. FIG. 9 shows the known elements from FIG. 4 and FIG. 5. Features. the position and/or location of which can be determined using the method in accordance with the disclosure, are exemplarily characterized in the form of the rotor blade flanges 910, the rotor blade tips 920 and the hub 930. A portion 940 of the wind turbine which can be detected by the recording unit, is shown exemplarily. A plurality of further or other features is also conceivable. Individual points of the rotor blade flange, for example, may also form features. By taking pictures of a portion 940 of the wind turbine, the feature rotor blade tips 920, for example, can be recognized, and the evaluation of location and/or position of the rotor blade tips in accordance with the disclosure.

Figure 10:
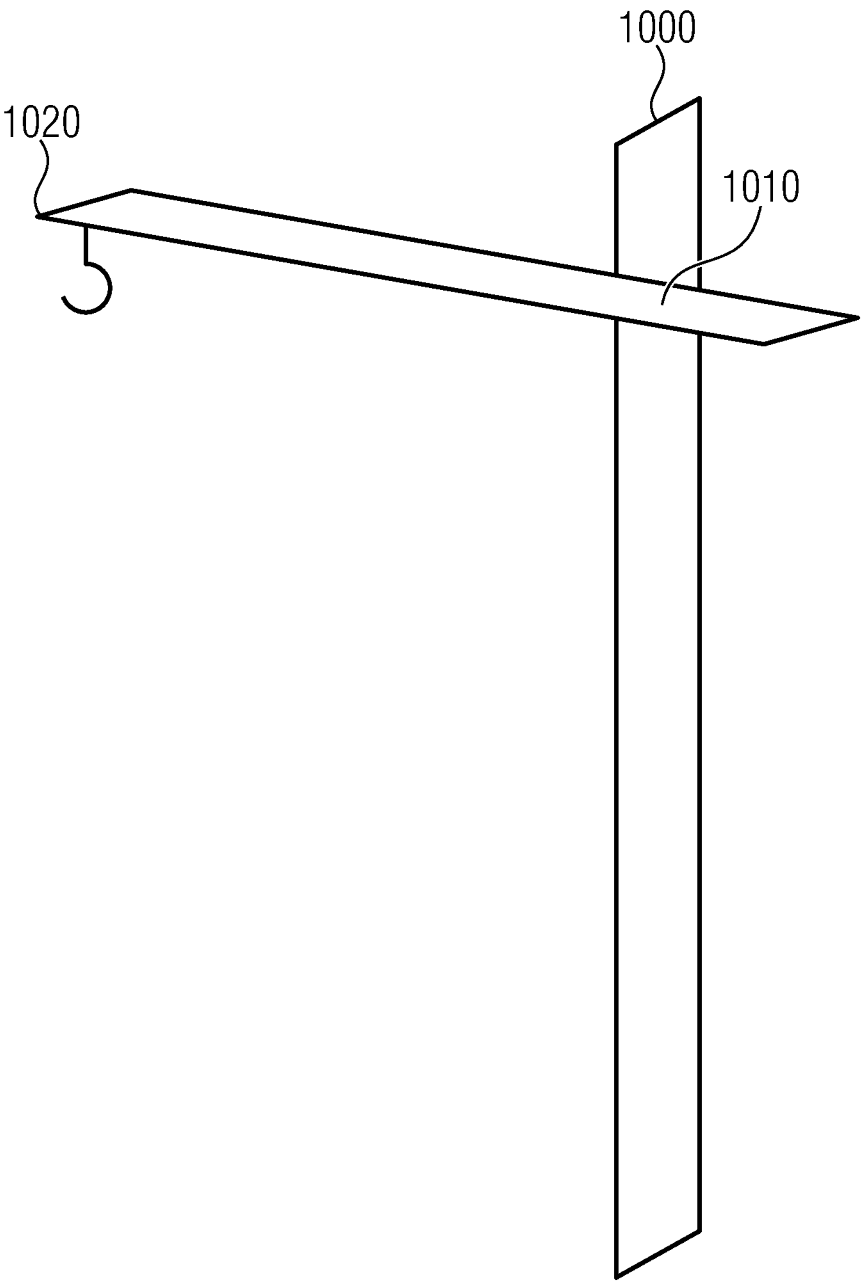
FIG. 10 is a schematic side view of a crane with exemplary features in accordance with an embodiment of the present disclosure.

FIG. 10 shows a schematic side view of an example of the object in the form of a crane in accordance with an embodiment of the present disclosure. FIG. 10 shows a crane 1000. Exemplary features of the crane are characterized by the connection 1010 between the tower and the boom and the tip 1020 of the boom. By means of the method in accordance with the disclosure, recognizing positons and/or locations of the features can be performed by recording several portions of the crane 1000. This can be used, for example, on permanent construction sites to quickly and inexpensively check the integrity of a crane 1000. Since the orientation can vary depending on the previous load movement of the crane, in accordance with the disclosure, data can be detected without an additional, time-consuming alignment of the crane 1000. A model of the crane 1000 can be generated by evaluating the positions and/or locations of the features to perform autonomous inspection flights.

All the listed materials, environmental influences, electrical characteristics and optical characteristics are to be regarded as exemplary and not exhaustive.

Generally, embodiments in accordance with the present disclosure are based on the idea of marking significant points on images made, for example obtained from optical detection. The significant points may be edge points. A ray or straight can be projected along the image depth using known positions and locations, like orientations of the images, and parameters of the recording unit, like the camera of the recording unit. An exact point in space can, for example, be determined by evaluating several images. A measure to be determined or a parameter to be determined of the object, like the wind turbine, can subsequently be established using these points.

Embodiments in accordance with the present disclosure relate to a method for generating calibration data for an automatic position determination or waypoint determination for autonomous flights of a recording unit, like a drone (UAV), in preparation for a method for determining a path along an object and system.

Embodiments in accordance with the present disclosure relate to inspecting a wind turbine using a recording unit, like a commercially available drone (UAV), which can be equipped with a camera and/or lightning protection measurement. The drone can additionally comprise further sensors or modules. Exemplarily sensors can be equipped with radar, ultrasound, infrared, laser or further technologies. The recording unit can thus automatically fly a route along a wind turbine to take pictures or measurements of the object and detect possible damage.

In general, embodiments in accordance with the present disclosure are based on the idea to automate measuring a wind turbine using a recording unit, like a commercially available drone, and generate a calibration data set for automatically flying along the wind turbine. Images of the rotor hub, the positioning of the rotor blades and the blade tips can be taken automatically. A flight path of the recording unit along the wind turbine can be calculated from evaluating the images or recordings.

Objects in accordance with embodiments of the present disclosure may comprise wind turbines, cranes, bridges or bridge piers, dams or power poles, for example. However, this list is not to be considered as being exhaustive. The method in accordance with the disclosure is of particular advantage for difficult-to-access large objects which have to be inspected or of which a model is to be generated.

Embodiments in accordance with the present disclosure comprise an automatic calibration flight for the wind turbine after ground calibration, for example comprising determining the tower center, the tower height and the orientation of the wind turbine, like the tower azimuth, with known values for the hub height and length of the rotor blades so that a sufficient wind wheel position can be assumed for the automated calibration flight with sufficient safety distance, but a distance of less than 20 m, for example. Additionally, this flight can allow determining precise measuring values for the position of the rotor blade tips, and the rotor blade flanges and further features or parameters, for example.

Embodiments in accordance with the present disclosure are based on using geometrical auxiliary constructions for determining positions and/or locations of features or parameters. Geometrical auxiliary constructions here may comprise rays or straights. Depending on the specific feature or parameter, a corresponding form of the geometrical auxiliary reconstruction, that is of a straight or ray, for example, or only a direction vector of a straight or a direction vector of a ray may be employed. Methods and systems in accordance with the disclosure are not restricted to the specific usage of a certain form of representation of the information which may be represented, for example, by a straight or a ray. When using a ray originating from a first point and comprising a second point, by knowing the two points, a corresponding, respective straight is known which also comprises the two points and comprises the same information content. Conversely, a straight provides directional information for a ray which may be formed as a subsection of the straight. These forms of representation are intended to be merely exemplary and, with the same information content, may be treated to be interchangeable as desired in the context of a particular task.

Generally, embodiments in accordance with the present disclosure may comprise determining or calculating the positions of the rotor blade tips of a wind turbine. An amount of straights or rays between the position of a rotor blade tip identified in an image and the respective position of the recording unit in the three-dimensional space, for example, can be set up for determining the positions. Correspondingly, a "point of intersection" of the amount of straights or rays in the three-dimensional space can be searched for determining the position of the rotor blade tip. In simple words, the starting situation in accordance with such embodiments can be a number of rays in 3D, the "point of intersection" of which is searched. In reality, that is in practical use at wind turbines, with data from real recording units, some or, for example, all straights or rays may be skewed and not intersect at any point. According to such embodiments, a point P closest to a "point of intersection" can be determined instead.

Two definitions can be used for this and the corresponding processing steps be performed, for example:

"minimum distance": The minimum distance of a 3D point to a ray or, for example, a straight is the length of the perpendicular line between point and ray or point and straight, for example.

"sum of the squares of the minimum distances": For the given rays, the minimum distances to a point are calculated and squared. Then, the sum over these squared distances is calculated.

The searched point is exactly that point that minimizes the sum of the squares of the minimum distances.

The point P can be determined, for example, using an optimization algorithm, like the "limited-memory Broyden-Fletscher-Goldfarb-Shanno" algorithm (L-BFGS).

The point P, for example, can be used as a result for the position of the rotor blade tip.

Although some aspects have been described in the context of an apparatus or device, it is understood that these aspects also represent a description of the corresponding method so that a block or component of an apparatus or system is also to be understood to be a corresponding method step or feature of a method step. In analogy, aspects described in connection with or as a method step also represent a description of a corresponding block or detail or feature of a corresponding apparatus. Some or all of the method steps may be performed by (or using) a hardware apparatus, such as a microprocessor, a programmable computer, or an electronic circuit. In some embodiments, some or more of the most important method steps may be performed by such an apparatus.

Depending on particular implementation requirements, embodiments of the invention may be implemented in hardware or in software. The implementation may be performed using a digital storage medium, for example a floppy disk, a DVD, Blu-ray disc, CD, ROM, PROM, EPROM, EEPROM, or FLASH memory, a hard disk, or any other magnetic or optical storage which has stored thereon electronically readable control signals which can or do interact with a programmable computer system so as to perform the respective method. Therefore, the digital storage medium may be computer-readable.

Thus, some embodiments according to the invention include a data carrier having electronically readable control signals capable of cooperating with a programmable computer system such that any of the methods described herein is performed.

Generally, embodiments of the present invention may be implemented as a computer program product having program code, the program code being operative to perform any of the methods when the computer program product runs on a computer.

For example, the program code may also be stored on a machine-readable carrier.

Other embodiments include the computer program for performing any of the methods described herein, wherein the computer program is stored on a machine-readable carrier.

In other words, an embodiment of the inventive method is thus a computer program comprising program code for performing any of the methods described herein when the computer program runs on a computer.

Thus, another embodiment of the inventive methods is a data carrier (or digital storage medium or computer-readable medium) on which the computer program for performing any of the methods described herein is recorded. The data carrier, digital storage medium, or computer-readable medium is typically tangible and/or non-transitory or non-transient.

Thus, a further embodiment of the inventive method is a data stream or sequence of signals constituting the computer program for performing any of the methods described herein. The data stream or sequence of signals may, for example, be configured to be transferred via a data communication link, for example via the Internet.

Another embodiment comprises processing means, such as a computer or programmable logic device, configured or adapted to perform any of the methods described herein.

Another embodiment includes a computer having installed thereon the computer program for performing any of the methods described herein.

Another embodiment according to the invention comprises an apparatus or system configured to transmit a computer program for performing at least one of the methods described herein to a receiver. The transmission may, for example, be electronic or optical. The receiver may be, for example, a computer, mobile device, storage device, or similar device. The apparatus or system may include, for example, a file server for transmitting the computer program to the receiver.

In some embodiments, a programmable logic device (for example, a field programmable gate array, FPGA) may be used to perform some or all of the functionalities of the methods described herein. In some embodiments, a field programmable gate array may cooperate with a microprocessor to perform any of the methods described herein. In general, in some embodiments, the methods are performed on the part of any hardware apparatus. This may be general-purpose hardware such as a computer processor (CPU), or hardware specific to the method, such as an ASIC.

The apparatus or systems described herein may be implemented using, for example, a hardware apparatus, or using a computer, or using a combination of a hardware apparatus and a computer.

The apparatus or systems described herein, or any components of the apparatus or systems described herein, may be implemented at least partly in hardware and/or in software (computer program).

For example, the methods described herein may be implemented using a hardware apparatus, or using a computer, or using a combination of a hardware apparatus and a computer.

The methods described herein, or any components of the methods described herein, may be performed at least partly by hardware and/or by software.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A method for detecting an object describable by a plurality of predetermined features, the method comprising:

(a) flying along the object and detecting several portions of the object using at least one recording unit in combination with a drone, in order to obtain image sets, wherein each of the portions is detected multiple times from different positions of the recording unit to generate a set of images of the image sets, wherein position and location information of the recording unit are associated to each image; and (b) recognizing features in the image sets; and (c) determining the positions and/or locations of the features using the position and location information of the images which comprise the features;

wherein the object is a wind turbine, the wind turbine comprising a tower, a nacelle, a hub, rotor blade flanges and rotor blades and a common rotation axis of the rotator blades; and the method further comprising determining one or more parameters of the wind turbine based on the positions and/or locations of the features;

wherein the parameter comprises at least one of the following enumerate features:

1) a position of a rotor blade tip which is determined as follows:

determining a straight between the position of the rotor blade tip identified in an image and the respective position of the recording unit, wherein the location of the recording unit at the time of recording the image and characteristics of the recording unit are also taken into consideration for determining the straight, apart from the position of the recording unit at the time of recording the image and the identified position of the rotor blade tip;

determining a plurality of straights for a set of images of the rotor blade tip;

evaluating the plurality of straights in pairs;

calculating a point of intersection for each pair of straights; and calculating the position of the rotor blade tip from an amount of the points of intersection of the pairs of straights;

2) a position of a rotor blade flange which is determined as follows:

determining a first straight between the position of a first point of the rotor blade flange identified in an image and the position of the recording unit and a second straight between the position of a second point of the rotor blade flange, opposite the first point, identified in the same image and the position of the recording unit, wherein the location of the recording unit at the time of recording the image and characteristics of the recording unit are also taken into consideration for determining the first and second straights, apart from the position of the recording unit at the time of recording the image and the identified positions of the points of the rotor blade flanges;

determining another straight passing in the center between the first and the second straight;

determining a plurality of further straights for a set of images of the rotor blade flange; and determining the position of the rotor blade flange from the plurality of further straights;

3) a location of the rotor blade flange which is determined as follows:

identifying two opposite points of the rotor blade flange in an image;

determining a direction vector of a connecting straight between the positions of the two opposite points of the rotor blade flange;

determining a plurality of direction vectors of connecting straights for a set of images of the rotor blade flange;

calculating an amount of possible normal vectors of the rotor blade flange from the plurality of the directional vectors of the connecting straights by forming the cross product of the direction vectors of the connecting straights in pairs; and calculating a normal vector of the rotor blade flange from the amount of possible normal vectors;

4) the tower center which is determined as follows:

at least partly circling the tower by the recording unit along the outer wall of the tower;

recording the positions of the recording unit when circling the tower;

forming position subsets from three points each, wherein the three points comprise a predetermined distance to one another;

determining an amount of centers of gravity of triangles from a plurality of position subsets, wherein each triangle is formed from the three points of a position subset; and calculating the center of the tower from an average of the amount of centers of gravity of triangles; or determining an amount of circle centers from a plurality of position subsets, wherein each circle center is determined from the three points of a position subset, using the equation of circle; and calculating the center of the tower from the amount of the circle centers; or determining an amount of circumcircle centers from a plurality of position subsets, wherein each circumcircle center is the center of a circumcircle of a triangle which is formed from the three points of a position subset; and calculating the center of the tower from the amount of circumcircle centers.

2. The method in accordance with claim 1, wherein detecting several portions of the object is an optical detection.

3. The method in accordance with claim 1, the method further comprising:

determining at least one dimension of the object by evaluating a reference point of the object, and the position of one or more of the features.

4. The method in accordance with claim 3, the method further comprising:

determining the reference point of the object by placing the recording unit at the reference point and subsequently evaluating the position information of the recording unit.

5. The method in accordance with claim 1, wherein the positions of the recording unit and the features comprise coordinates of a predetermined coordinate system.

6. The method in accordance with claim 5, the method further comprising:

employing a real-time kinematics (RTK) system for correcting the position and location information of the recording unit.

7. The method in accordance with claim 1, wherein step (b) comprises recognizing the features in the image sets in an automated manner and/or step (c) comprises determining the positions and/or locations of the features in an automated manner.

8. The method in accordance with claim 1, the method further comprising:

generating or modifying a model or parametrizing a generic model of the object using the position and/or location information of the features.

9. A method for inspecting an object, comprising:

flying along the object along a path, and detecting one or more portions of the object while flying, wherein the path is based on a representation of the object by the features or parameters acquired by the method for detecting an object describable by a plurality of predetermined features in accordance with claim 1.

10. A system for detecting an object describable by a plurality of predetermined features, the system comprising:

a recording unit in combination with a drone, configured:

to fly along the object, to detect several portions of the object, in order to obtain image sets;

to detect each of the portions multiple times from different positions to generate a set of images of the image sets, wherein position and location information of the recording unit are associated to each image; and an evaluation device configured to recognize features in the image sets and determine positions and/or locations of the features using the position and location information of the images which comprise the features;

wherein the object is a wind turbine, the wind turbine comprising a tower, a nacelle, a hub, rotor blade flanges and rotor blades and a common rotation axis of the rotator blades; and wherein the evaluation device is configured to determine one or more parameters of the wind turbine based on the positions and/or locations of the features;

wherein the parameter comprises at least one of the following:

1) a position of a rotor blade tip, wherein the evaluation device is configured to:

determine a straight between the position of the rotor blade tip identified in an image and the respective position of the recording unit, wherein the location of the recording unit at the time of recording the image and characteristics of the recording unit are also taken into consideration for determining the straight, apart from the position of the recording unit at the time of recording the image and the identified position of the rotor blade tip;

determine a plurality of straights for a set of images of the rotor blade tip;

evaluate the plurality of straights in pairs;

calculate a point of intersection for each pair of straights; and calculate the position of the rotor blade tip from an amount of the points of intersection of the pairs of straights;

in order to determine the position of a rotor blade tip;

2) a position of a rotor blade flange, wherein the evaluation device is configured to:

determine a first straight between the position of a first point of the rotor blade flange identified in an image and the position of the recording unit and a second straight between the position of a second point of the rotor blade flange, opposite the first point, identified in the same image and the position of the recording unit, wherein the location of the recording unit at the time of recording the image and characteristics of the recording unit are also taken into consideration for determining the first and second straights, apart from the position of the recording unit at the time of recording the image and the identified positions of the points of the rotor blade flanges;

determine another straight passing in the center between the first and the second straight;

determine a plurality of further straights for a set of images of the rotor blade flange; and determine the position of the rotor blade flange from the plurality of further straights;

in order to determine the position of a rotor blade flange;

3) a location of the rotor blade flange, wherein the evaluation device is configured to:

identify two opposite points of the rotor blade flange in an image;

determine a direction vector of a connecting straight between the positions of the two opposite points of the rotor blade flange;

determine a plurality of direction vectors of connecting straights for a set of images of the rotor blade flange;

calculate an amount of possible normal vectors of the rotor blade flange from the plurality of the directional vectors of the connecting straights by forming the cross product of the direction vectors of the connecting straights in pairs; and calculate a normal vector of the rotor blade flange from the amount of possible normal vectors;

in order to determine the location of the rotor blade flange;

4) the tower center, wherein in order to determine the tower center:

the recording unit is configured to record the positions of the recording unit when the recording unit at least partly circles the tower along the outer wall of the tower;

the evaluation device is configured to form position subsets from three points each, wherein the three points comprise a predetermined distance to one another;

determine an amount of centers of gravity of triangles from a plurality of position subsets, wherein each triangle is formed from the three points of a position subset; and calculate the center of the tower from an average of the amount of centers of gravity of triangles; or determine an amount of circle centers from a plurality of position subsets, wherein each circle center is determined from the three points of a position subset, using the equation of circle; and calculate the center of the tower from the amount of the circle centers; or determine an amount of circumcircle centers from a plurality of position subsets, wherein each circumcircle center is the center of a circumcircle of a triangle which is formed from the three points of a position subset; and calculate the center of the tower from the amount of circumcircle centers.

11. The system in accordance with claim 10, wherein the evaluation device is part of the recording unit.

12. The method in accordance with claim 1, wherein step (c) further comprises:

establishing a plurality of geometrical auxiliary constructions, the geometrical auxiliary constructions being established for each image which comprises a feature, between the position of the recording unit associated to the image and the position of a feature identified in the image, or the positions of several features identified in an image, in a coordinate system; and evaluating the geometrical auxiliary constructions to acquire an amount of results for the position and/or location of the feature or a feature derived from several features; and statistically evaluating the amount of results.

13. The method in accordance with claim 1, the method further comprising:

determining an orientation of the object by evaluating a reference position of the object and position information of the recording unit, the recording unit being positioned in correspondence with the orientation of the object at the time of recording the position information.

14. The method in accordance with claim 13, the method further comprising: determining the reference position of the object by evaluating an amount of position information of the recording unit, wherein the amount of position information originates from a trajectory of movement of the recording unit.

* * * * *